(12) United States Patent
Xu et al.

(10) Patent No.: US 12,149,711 B2
(45) Date of Patent: Nov. 19, 2024

(54) DATA FRAME TRANSMISSION METHOD AND COMMUNICATION APPARATUS

(71) Applicant: HUAWEI TECHNOLOGIES CO., LTD., Guangdong (CN)

(72) Inventors: Zijie Xu, Shanghai (CN); Shuri Liao, Shanghai (CN); Shengyue Dou, Shanghai (CN); Guohua Zhou, Shanghai (CN); Yuejun Wei, Shanghai (CN); Ning He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 18/053,736

(22) Filed: Nov. 8, 2022

(65) Prior Publication Data
US 2023/0066749 A1    Mar. 2, 2023

Related U.S. Application Data

(63) Continuation of application No. PCT/CN2021/088105, filed on Apr. 19, 2021.

(30) Foreign Application Priority Data

May 13, 2020   (CN) .......................... 202010400633.7

(51) Int. Cl.
*H04N 19/174*   (2014.01)
*H04N 19/172*   (2014.01)

(52) U.S. Cl.
CPC ......... *H04N 19/174* (2014.11); *H04N 19/172* (2014.11)

(58) Field of Classification Search
CPC ........................... H04N 19/174; H04N 19/172
See application file for complete search history.

(56) References Cited

U.S. PATENT DOCUMENTS 10,659,190 B1*   5/2020   Liu ....................... H04L 1/0018
2012/0134276 A1   5/2012   He et al.
2016/0212439 A1*  7/2016   Hannuksela ........... H04N 19/46

FOREIGN PATENT DOCUMENTS

CN        1342355 A        3/2002
CN        1864335 A       11/2006
(Continued)

OTHER PUBLICATIONS

Yu et al.,"A highly efficient low delay architecture for transporting H.264 video over wireless channel", Apr. 4, 2004, pp. 369-285 (Year: 2004).*

(Continued)

*Primary Examiner* — Jonathan R Messmore
(74) *Attorney, Agent, or Firm* — HUAWEI TECHNOLOGIES CO., LTD.

(57) ABSTRACT

This application provides a wireless communication method and a communication apparatus. The method includes a terminal device receives a data frame from a second device by using a first device, and notifies the first device when the terminal device determines that a communication data block from the first device is not successfully received. After determining a protocol data packet corresponding to the communication data block, the first device notifies the second device that the first protocol data packet is not successfully transmitted. After determining a data unit that is in the data frame and that corresponds to the communication data block, the terminal device notifies the second device through second-step feedback.

20 Claims, 10 Drawing Sheets

(56) References Cited

FOREIGN PATENT DOCUMENTS

| CN | 101360243 | A | 2/2009 |
|---|---|---|---|
| CN | 101193312 | B | 1/2011 |
| CN | 101983509 | B | 11/2013 |
| CN | 103988447 | A | 8/2014 |
| CN | 108631918 | A | 10/2018 |
| CN | 105637790 | B | 3/2019 |
| CN | 110149491 | A | 8/2019 |
| CN | 110996122 | A | 4/2020 |
| EP | 1603339 | A1 | 12/2005 |
| WO | 2018204330 | A1 | 11/2018 |

OTHER PUBLICATIONS

Yu H-B et al: "A highly efficient low delay architecture for transporting H.264 video over wireless channel", Apr. 4, 2004, pp. 369-385, XP004495311.

RP-190836, Qualcomm, XR (eXtended Reality) and 5G for Rel-17 Qualcomm views, 3GPP RAN #84, Newport Beach, Jun. 3-6, 2019, 9 pages.

Wikipedia, H.26x, https://en.wikipedia.org/wiki/Category:H.26x, Jul. 5, 2019, 1 pages.

ITU-T H.264(Jun. 2019), Series H: Audiovisual and Multimedia Systems, Infrastructure of audiovisual services-Coding of moving video, Advanced video coding for generic audiovisual services, total 836 pages.

ITU-T H.265(Jun. 2019), Series H: Audiovisual and Multimedia Systems, Infrastructure of audiovisual services Coding of moving video, High efficiency video coding, total 696 pages.

\* cited by examiner

DATA FRAME TRANSMISSION METHOD AND COMMUNICATION APPARATUS

CROSS-REFERENCE TO RELATED APPLICATIONS

This application is a continuation of International Application No. PCT/CN2021/088105, filed on Apr. 19, 2021, which claims priority to Chinese Patent Application No. 202010400633.7, filed on May 13, 2020. The disclosures of the aforementioned applications are hereby incorporated by reference in their entireties.

TECHNICAL FIELD

This application relates to the communication field, and more specifically, to a data frame transmission method and a communication apparatus.

BACKGROUND

In recent years, with continuous progress and improvement of an extended reality (extended reality, XR) technology, a related industry has developed vigorously. Nowadays, the extended reality technology has entered various fields, for example, education, entertainment, military affairs, medical care, environmental protection, transportation, and public health, closely related to production and life of people. Extended reality is a general term of various reality-related technologies. The various reality-related technologies may include, for example, virtual reality (virtual reality, VR), augmented reality (augmented reality, AR), and mixed reality (mixed reality, MR). A virtual reality VR technology mainly means rendering of visual and audio scenarios to simulate sensory stimulation of vision and audio in a real world to a user as much as possible. An augmented reality AR technology mainly means providing visual or auditory additional information or manually generated content in a real environment sensed by the user. A mixed reality MR technology is an advanced form of the AR. One of implementations of the MR technology is inserting some virtual elements into a physical scenario, to provide the user with immersive experience in which the elements are a part of a real scenario. In conclusion, an XR service has requirements for a high transmission rate and a low transmission delay. When the XR is applied to a wireless communication scenario, a limitation caused by a connection cable can be avoided. However, a wireless communication channel is prone to fluctuation. This may cause a series of problems such as frame freezing and erratic display in the XR service. How to improve reliability of the XR service in the wireless communication scenario becomes a problem that a person skilled in the art urgently needs to resolve.

SUMMARY

This application provides a communication method and a communication apparatus, to improve data transmission reliability.

According to a first aspect, a communication method is provided. The method may be performed by a terminal device or a module (for example, a chip or a processor) disposed in (or used in) the terminal device. The following provides descriptions by using an example in which the method is performed by the terminal device.

The method includes: sending first indication information to a first device, where the first indication information indicates that a first communication data block is not successfully received; and sending third indication information to the first device, where the third indication information indicates that a first data unit is not successfully received, the first data unit includes data in the first communication data block, and the first data unit is a data unit in a first data frame.

According to the foregoing solution, a second device can determine the first data frame that is not successfully transmitted and the first data unit in the first data frame in time through a two-step feedback of the terminal device, to adjust a reference frame and/or a reference data unit for subsequent data frame encoding, and avoid encoding performed by referencing a data frame or a data unit that is not successfully transmitted. This can improve data transmission reliability.

Optionally, the first communication data block may be a transport block or a code block in a communication system (for example, a 4G or 5G communication system), or the first communication data block may be a wireless data packet in a wireless local area network communication system.

Optionally, the first indication information and second indication information are wireless communication information.

By way of example but not limitation, the wireless communication information is air interface information.

For example, when the first device is an eNB, the air interface information may be air interface information in a 4G system; or when the first device is a gNB, the air interface information may be air interface information in a 5G system. For example, the first indication information and the third indication information may be uplink control information (uplink control information, UCI) sent by the terminal device or wireless data information carried on an uplink shared channel (physical uplink shared channel, PUSCH). However, this application is not limited thereto.

Optionally, the first indication information may be a physical-layer hybrid automatic repeat request HARQ feedback. For example, the first indication information is a NACK.

With reference to the first aspect, in some implementations of the first aspect, the third indication information is carried on an uplink configured grant resource or a semi-persistent scheduling resource.

According to the foregoing solution, the third indication information is transmitted by using the uplink configured grant (which may also be referred to as scheduling-free grant) resource or the semi-persistent scheduling resource, so that a delay caused by sending a scheduling request and receiving a scheduling grant by the terminal device can be reduced, to improve data transmission reliability while reducing a service delay.

With reference to the first aspect, in some implementations of the first aspect, the first data frame is a video data frame, and/or the first data unit is one or more of an image slice (slice), an image tile (tile), a pixel, a tile, or a block.

According to the foregoing solution, the solution provided in this application may be applied to video data frame transmission. The second device can determine the video data frame that is not successfully transmitted and the first data unit in the video data frame in time through the two-step feedback of the terminal device, to adjust a reference frame and/or a reference data unit for subsequent video data frame encoding, and avoid encoding performed by referencing a video data frame or a data unit that is not successfully transmitted. This can improve data transmission reliability.

With reference to the first aspect, in some implementations of the first aspect, the third indication information further indicates that the first data frame is a data frame at a first coding layer in layered data encoding.

According to the foregoing solution, the two-step feedback of the terminal device may be implemented in combination with the layered data encoding, to improve data transmission reliability while reducing the service delay.

With reference to the first aspect, in some implementations of the first aspect, the layered data encoding is scalable video coding SVC or scalability extension of high efficiency video coding SHVC, and the first coding layer is a base layer or an enhancement layer.

With reference to the first aspect, in some implementations of the first aspect, the layered data encoding is multi-view video coding, and the first coding layer is a data layer inside a field of view FOV or a data layer outside the FOV.

Data is divided into coding layers or data layers that have different attributes, so that extended reality data having different transmission requirements may be differentiated. Different transmission policies are respectively used for extended reality data having a higher priority and an extended reality data flow having a lower priority, so that the XR data can be transmitted more efficiently by using a limited network resource.

According to a second aspect, a communication method is provided. The method may be performed by a first device or a module (for example, a chip or a processor) disposed in (or used in) the first device. The following provides descriptions by using an example in which the method is performed by the first device.

The method includes: receiving first indication information from a terminal device, where the first indication information indicates that a first communication data block is not successfully received; sending second indication information to a second device, where the second indication information indicates that a first protocol data packet is not successfully transmitted, and the first protocol data packet includes data in the first communication data block; receiving third indication information from the terminal device; and sending the third indication information to the second device, where the third indication information indicates that a first data unit is not successfully received, the first data unit includes the data in the first communication data block, and the first data unit is a data unit in a first data frame.

According to the foregoing solution, the first device assists in completing a two-step feedback of the terminal device, so that the second device can determine the first data frame that is not successfully transmitted and the first data unit in the first data frame in time, to adjust, in time, a reference frame and/or a reference data unit for subsequent data frame encoding, and avoid encoding performed by referencing a data frame or a data unit that is not successfully transmitted. This can improve data transmission reliability.

By way of example but not limitation, the first device may be a base station or an access network device. For example, the first device may be an eNB in a 4G system or a gNB in a 5G system, or the first device may be a router or an access point (access point, AP) in a wireless local area network. However, this application is not limited thereto.

With reference to the second aspect, in some implementations of the second aspect, the third indication information is carried on an uplink configured grant resource or a semi-persistent scheduling resource.

With reference to the second aspect, in some implementations of the second aspect, the first data frame is a video data frame, and/or the first data unit is an image slice or an image tile.

With reference to the second aspect, in some implementations of the second aspect, the third indication information further indicates that the first data frame is a data frame at a first coding layer in layered data encoding.

With reference to the second aspect, in some implementations of the second aspect, the layered data encoding is scalable video coding SVC or scalability extension of high efficiency video coding SHVC, and the first coding layer is a base layer or an enhancement layer.

With reference to the second aspect, in some implementations of the second aspect, the layered data encoding is multi-view video coding, and the first coding layer is a data layer inside a field of view FOV or a data layer outside the FOV. With reference to the second aspect, in some implementations of the second aspect, the sending second indication information to a second device includes: sending the second indication information to the second device by using a core network control plane function node.

With reference to the second aspect, in some implementations of the second aspect, the sending the third indication information to the second device includes: sending the third indication information to the second device by using a core network user plane function node.

According to a third aspect, a communication method is provided. The method may be performed by a second device or a module (for example, a chip or a processor) disposed in (or used in) the second device. The following provides descriptions by using an example in which the method is performed by the second device.

The method includes: receiving second indication information from a first device, where the second indication information indicates that a first protocol data packet is not successfully transmitted, and data in the first protocol data packet belongs to a first data frame; receiving third indication information from the first device, where the third indication information indicates that a first data unit is not successfully received, and the first data unit is a data unit in the first data frame; and encoding a second data frame based on the second indication information and the third indication information, where the second data frame is a data frame that is after the first data frame.

According to the foregoing solution, the first device assists in a two-step feedback of a terminal device, so that the second device can determine the first data frame that is not successfully transmitted and the first data unit in the first data frame in time, to adjust, in time, a reference frame and/or a reference data unit for subsequent data frame encoding, and avoid encoding performed by referencing a data frame or a data unit that is not successfully transmitted. This can improve data transmission reliability.

By way of example but not limitation, the second device may be a server or another terminal device.

With reference to the third aspect, in some implementations of the third aspect, the encoding a second data frame includes: encoding the second data frame based on the first data frame and a third data frame, where the third data frame is a data frame that is before the first data frame.

According to the foregoing solution, after determining the first data frame that is not successfully transmitted and the first data unit in the first data frame, the second device adjusts, in time, the reference frame and/or the reference data unit for subsequent data frame encoding, and avoids encoding performed by referencing the data frame or the data unit that is not successfully transmitted. This can improve data transmission reliability.

With reference to the third aspect, in some implementations of the third aspect, the encoding the second data frame based on the first data frame and a third data frame includes: encoding the second data frame based on a second data unit in the first data frame and a third data unit in the third data frame, where the second data unit is a data unit other than the first data unit in the first data frame, and the third data unit corresponds to the first data unit.

According to the foregoing solution, after determining the first data frame that is not successfully transmitted and the first data unit in the first data frame, the second device adjusts, in time, the reference frame and/or the reference data unit for subsequent data frame encoding. This can improve data transmission reliability.

Optionally, the second data unit is all data units other than the first data unit in the first data frame, or the second data unit is a part of data units other than the first data unit in the first data frame.

With reference to the third aspect, in some implementations of the third aspect, the first data frame, the second data frame, and the third data frame are video data frames, and/or data units in the first data frame, the second data frame, and the third data frame are image slices or image tiles.

With reference to the third aspect, in some implementations of the third aspect, the encoding a second data frame includes: encoding the second data frame based on a third data frame, where the third data frame is a data frame that is before the first data frame.

With reference to the third aspect, in some implementations of the third aspect, the third indication information further indicates that the first data frame is a data frame at a first coding layer in layered data encoding.

With reference to the third aspect, in some implementations of the third aspect, the layered data encoding is scalable video coding SVC or scalability extension of high efficiency video coding SHVC, and the first coding layer is a base layer or an enhancement layer.

With reference to the third aspect, in some implementations of the third aspect, the layered data encoding is multi-view video coding, and the first coding layer is a data layer inside a field of view FOV or a data layer outside the FOV.

With reference to the third aspect, in some implementations of the third aspect, the receiving second indication information from a first device includes: receiving the second indication information from the first device by using a core network control plane function node.

With reference to the third aspect, in some implementations of the third aspect, the receiving third indication information from the first device includes: receiving the third indication information from the first device by using a core network user plane function node.

According to a fourth aspect, a communication method is provided. The method may be performed by a terminal device or a module (for example, a chip or a processor) disposed in (or used in) the terminal device. The following provides descriptions by using an example in which the method is performed by the terminal device.

The method includes: The terminal device receives a first data frame from a second device. The terminal device sends indication information to the second device, where the indication information indicates that the first data frame or a first data unit is not successfully received.

By way of example but not limitation, the second device may be a server or another terminal device.

With reference to the fourth aspect, in some implementations of the fourth aspect, the indication information includes an identifier of the first data unit and/or an identifier of the first data frame.

With reference to the fourth aspect, in some implementations of the fourth aspect, that the terminal device receives a first data frame from a second device includes: The terminal device receives the first data frame from the second device by using a first device.

With reference to the fourth aspect, in some implementations of the fourth aspect, that the terminal device receives the first data frame from the second device by using a first device includes: The terminal device receives a first communication data block from the first device, where the first communication data block includes data in the first data frame.

With reference to the fourth aspect, in some implementations of the fourth aspect, that the terminal device sends indication information to the second device includes: The terminal device sends the indication information to the second device by using the first device.

With reference to the fourth aspect, in some implementations of the fourth aspect, that the terminal device sends the indication information to the second device by using the first device includes: The terminal device sends first indication information to the first device, where the first indication information indicates that the first communication data block from the first device is not successfully received, and the indication information includes the first indication information.

With reference to the fourth aspect, in some implementations of the fourth aspect, the first indication information is HARQ feedback information.

For example, if the first indication information is a negative acknowledgment (negative-acknowledgment, NACK), it indicates that the first communication data block is not successfully received.

With reference to the fourth aspect, in some implementations of the fourth aspect, that the terminal device sends the indication information to the second device by using the first device includes: The terminal device sends third indication information to the first device, where the third indication information indicates that the first data unit or the first data frame is not successfully received, the first data frame includes at least one data unit, the first data unit is one of the at least one data unit, and the indication information includes the third indication information.

With reference to the fourth aspect, in some implementations of the fourth aspect, the third indication information is carried on an uplink configured grant resource or a semi-persistent scheduling resource.

By way of example but not limitation, the first device may be an access network device. For example, the first device may be an eNB in a 4G system or a gNB in a 5G system, or the first device may be a router in a wireless local area network. However, this application is not limited thereto.

With reference to the fourth aspect, in some implementations of the fourth aspect, the first indication information and the third indication information are HARQ feedback information.

With reference to the fourth aspect, in some implementations of the fourth aspect, the first data frame is a video data frame, and/or the first data unit is one or more of an image slice (slice), an image tile (tile), a pixel, a tile, or a block.

With reference to the fourth aspect, in some implementations of the fourth aspect, the third indication information further indicates that the first data frame is a data frame at a first coding layer in layered data encoding.

With reference to the fourth aspect, in some implementations of the fourth aspect, the layered data encoding is scalable video coding SVC or scalability extension of high efficiency video coding SHVC, and the first coding layer is a base layer or an enhancement layer.

With reference to the fourth aspect, in some implementations of the fourth aspect, the layered data encoding is multi-view video coding, and the first coding layer is a data layer inside a field of view FOV or a data layer outside the FOV.

With reference to the fourth aspect, in some implementations of the fourth aspect, that the terminal device sends indication information to the second device includes: The terminal device sends the indication information to the second device by using an application layer.

For example, the terminal device sends the third indication information to the second device by using the transmission control protocol (transmission control protocol, TCP). Correspondingly, the first device transparently transmits the third indication information to the second device.

According to a fifth aspect, a communication method is provided. The method may be performed by a second device or a module (for example, a chip or a processor) disposed in (or used in) the second device. The following provides descriptions by using an example in which the method is performed by the second device.

The method includes: The second device sends a first data frame to a terminal device. The second device determines, based on indication information, that the first data frame or a first data unit is not successfully transmitted.

By way of example but not limitation, the second device may be a server or another terminal device.

With reference to the fifth aspect, in some implementations of the fifth aspect, the indication information includes an identifier of the first data frame or an identifier of a first data unit.

With reference to the fifth aspect, in some implementations of the fifth aspect, that the second device sends a first data frame to a terminal device includes: The second device sends the first data frame to the terminal device by using a first device.

With reference to the fifth aspect, in some implementations of the fifth aspect, that the second device sends the first data frame to the terminal device by using a first device includes: The second device generates a plurality of protocol data packets based on the first data frame. The second device sends a first protocol data packet to the first device, where the first protocol data packet is one of the plurality of protocol data packets.

With reference to the fifth aspect, in some implementations of the fifth aspect, that the second device determines, based on indication information, that the first data frame or a first data unit is not successfully transmitted includes: The second device receives second indication information from the first device, where the second indication information indicates that the first protocol data packet is not successfully transmitted. The second device determines, based on the first protocol data packet, that the first data frame corresponding to the first protocol data packet is not successfully transmitted, where the indication information includes the second indication information.

With reference to the fifth aspect, in some implementations of the fifth aspect, that the second device determines, based on indication information, that the first data frame or a first data unit is not successfully transmitted includes: The second device receives third indication information from the terminal device, where the third indication information indicates that the first data unit or the first data frame is not successfully received. The second device determines, based on the third indication information, that the first data unit or the first data frame is not successfully transmitted, where the first data frame includes at least one data unit, the first data unit is one of the at least one data unit, and the indication information includes the third indication information.

With reference to the fifth aspect, in some implementations of the fifth aspect, that the second device receives third indication information from the terminal device includes: The second device receives the third indication information from the terminal device by using the first device.

By way of example but not limitation, the first device may be a base station or an access network device. For example, the first device may be an eNB in a 4G system or a gNB in a 5G system, or the first device may be a router in a wireless local area network. However, this application is not limited thereto.

With reference to the fifth aspect, in some implementations of the fifth aspect, the first data frame is a video data frame, and/or the first data unit is one or more of an image slice (slice), an image tile (tile), a pixel, a tile, or a block.

With reference to the fifth aspect, in some implementations of the fifth aspect, the third indication information further indicates that the first data frame is a data frame at a first coding layer in layered data encoding.

With reference to the fifth aspect, in some implementations of the fifth aspect, the layered data encoding is scalable video coding SVC or scalability extension of high efficiency video coding SHVC, and the first coding layer is a base layer or an enhancement layer.

With reference to the fifth aspect, in some implementations of the fifth aspect, the layered data encoding is multi-view video coding, and the first coding layer is a data layer inside a field of view FOV or a data layer outside the FOV.

With reference to the fifth aspect, in some implementations of the fifth aspect, the third indication information is an application layer message from the terminal device.

For example, the terminal device sends the third indication information to the second device by using the transmission control protocol (transmission control protocol, TCP). Correspondingly, the first device transparently transmits the third indication information to the second device.

According to a sixth aspect, a communication apparatus is provided. The apparatus may be disposed in a terminal device (for example, a processor or a chip in the terminal device), or the apparatus may be the terminal device. The apparatus includes: a processing unit, configured to determine that a first communication data block is not successfully received; and a transceiver unit, configured to send first indication information to a first device, where the first indication information indicates that the first communication data block is not successfully received. The transceiver unit is further configured to send third indication information to the first device, where the third indication information indicates that a first data unit is not successfully received, the first data unit includes data in the first communication data block, and the first data unit is a data unit in a first data frame.

Optionally, the first communication data block may be a transport block or a code block in a communication system (for example, a 4G or 5G communication system), or the first communication data block may be a wireless data packet in a wireless local area network communication system.

Optionally, the first indication information and second indication information are air interface messages.

Optionally, the first indication information may be a physical-layer hybrid automatic repeat request HARQ feedback. For example, the first indication information is a NACK.

With reference to the sixth aspect, in some implementations of the sixth aspect, the third indication information is carried on an uplink configured grant resource or a semi-persistent scheduling resource.

With reference to the sixth aspect, in some implementations of the sixth aspect, the first data frame is a video data frame, and/or the first data unit is one or more of an image slice (slice), an image tile (tile), a pixel, a tile, or a block.

With reference to the sixth aspect, in some implementations of the sixth aspect, the third indication information further indicates that the first data frame is a data frame at a first coding layer in layered data encoding.

With reference to the sixth aspect, in some implementations of the sixth aspect, the layered data encoding is scalable video coding SVC or scalability extension of high efficiency video coding SHVC, and the first coding layer is a base layer or an enhancement layer.

With reference to the sixth aspect, in some implementations of the sixth aspect, the layered data encoding is multi-view video coding, and the first coding layer is a data layer inside a field of view FOV or a data layer outside the FOV.

According to a seventh aspect, a communication apparatus is provided. The apparatus may be disposed in a first device (for example, a processor or a chip in the first device), or the apparatus may be the first device. The apparatus includes: a transceiver unit, configured to receive first indication information from a terminal device, where the first indication information indicates that a first communication data block is not successfully received; and a processing unit, configured to determine, based on the first communication data block, that a first protocol data packet is not successfully transmitted, where the first protocol data packet includes data in the first communication data block. The transceiver unit is further configured to send second indication information to a second device, where the second indication information indicates that the first protocol data packet is not successfully transmitted. The transceiver unit is further configured to receive third indication information from the terminal device. The transceiver unit is further configured to send the third indication information to the second device, where the third indication information indicates that a first data unit is not successfully received, the first data unit includes the data in the first communication data block, and the first data unit is a data unit in a first data frame.

By way of example but not limitation, the first device may be a base station or an access network device.

With reference to the seventh aspect, in some implementations of the seventh aspect, the third indication information is carried on an uplink configured grant resource or a semi-persistent scheduling resource.

With reference to the seventh aspect, in some implementations of the seventh aspect, the first data frame is a video data frame, and/or the first data unit is an image slice or an image tile.

With reference to the seventh aspect, in some implementations of the seventh aspect, the third indication information further indicates that the first data frame is a data frame at a first coding layer in layered data encoding.

With reference to the seventh aspect, in some implementations of the seventh aspect, the layered data encoding is scalable video coding SVC or scalability extension of high efficiency video coding SHVC, and the first coding layer is a base layer or an enhancement layer.

With reference to the seventh aspect, in some implementations of the seventh aspect, the layered data encoding is multi-view video coding, and the first coding layer is a data layer inside a field of view FOV or a data layer outside the FOV.

With reference to the seventh aspect, in some implementations of the seventh aspect, the transceiver unit is specifically configured to send the second indication information to the second device by using a core network control plane function node.

With reference to the seventh aspect, in some implementations of the seventh aspect, the transceiver unit is specifically configured to send the third indication information to the second device by using a core network user plane function node.

According to an eighth aspect, a communication apparatus is provided. The apparatus may be disposed in a second device (for example, a processor or a chip in the second device), or the apparatus may be the second device. The apparatus includes: a transceiver unit, configured to receive second indication information from a first device, where the second indication information indicates that a first protocol data packet is not successfully transmitted, and data in the first protocol data packet belongs to a first data frame, where the transceiver unit is further configured to receive third indication information from the first device, where the third indication information indicates that a first data unit is not successfully received, and the first data unit is a data unit in the first data frame; and a processing unit, configured to encode a second data frame based on the second indication information and the third indication information, where the second data frame is a data frame that is after the first data frame.

By way of example but not limitation, the second device may be a server or another terminal device.

With reference to the eighth aspect, in some implementations of the eighth aspect, the processing unit is specifically configured to encode the second data frame based on the first data frame and a third data frame, where the third data frame is a data frame that is before the first data frame.

With reference to the eighth aspect, in some implementations of the eighth aspect, the processing unit is specifically configured to encode the second data frame based on a second data unit in the first data frame and a third data unit in the third data frame, where the second data unit is a data unit other than the first data unit in the first data frame, and the third data unit corresponds to the first data unit.

Optionally, the second data unit is all data units other than the first data unit in the first data frame, or the second data unit is a part of data units other than the first data unit in the first data frame.

With reference to the eighth aspect, in some implementations of the eighth aspect, the first data frame, the second data frame, and the third data frame are video data frames, and/or data units in the first data frame, the second data frame, and the third data frame are image slices or image tiles.

With reference to the eighth aspect, in some implementations of the eighth aspect, the processing unit is specifically configured to encode the second data frame based on a third data frame, where the third data frame is a data frame that is before the first data frame.

With reference to the eighth aspect, in some implementations of the eighth aspect, the third indication information further indicates that the first data frame is a data frame at a first coding layer in layered data encoding.

With reference to the eighth aspect, in some implementations of the eighth aspect, the layered data encoding is scalable video coding SVC or scalability extension of high efficiency video coding SHVC, and the first coding layer is a base layer or an enhancement layer.

With reference to the eighth aspect, in some implementations of the eighth aspect, the layered data encoding is multi-view video coding, and the first coding layer is a data layer inside a field of view FOV or a data layer outside the FOV.

With reference to the eighth aspect, in some implementations of the eighth aspect, the transceiver unit is specifically configured to receive the second indication information from the first device by using a core network control plane function node.

With reference to the eighth aspect, in some implementations of the eighth aspect, the transceiver unit is specifically configured to receive the third indication information from the first device by using a core network user plane function node.

According to a ninth aspect, a communication apparatus is provided, and includes a processor. The processor is coupled to a memory, and may be configured to execute instructions in the memory, to implement the method according to any one of the first aspect or the fourth aspect and the possible implementations of the first aspect or the fourth aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a tenth aspect, a communication apparatus is provided, and includes a processor. The processor is coupled to a memory, and may be configured to execute instructions in the memory, to implement the method according to any one of the second aspect and the possible implementations of the second aspect. Optionally, the communication apparatus further includes the memory. Optionally, the communication apparatus further includes a communication interface, and the processor is coupled to the communication interface.

In an implementation, the communication apparatus is a first device. When the communication apparatus is the first device, the communication interface may be a transceiver or an input/output interface. For example, the first device may be a base station or an access network device.

In another implementation, the communication apparatus is a chip disposed in a first device. When the communication apparatus is the chip disposed in the first device, the communication interface may be an input/output interface.

Optionally, the transceiver may be a transceiver circuit. Optionally, the input/output interface may be an input/output circuit.

According to an eleventh aspect, a communication apparatus is provided, and includes a processor. The processor is coupled to a memory, and may be configured to execute instructions in the memory, to implement the method according to any one of the third aspect or the fifth aspect and the possible implementations of the third aspect or the fifth aspect. Optionally, the communication apparatus further includes the memory. Optionally, the communication apparatus further includes a communication interface, and the processor is coupled to the communication interface.

In an implementation, the communication apparatus is a second device. When the communication apparatus is the second device, the communication interface may be a transceiver or an input/output interface. For example, the second device may be a server or another terminal device.

In another implementation, the communication apparatus is a chip disposed in a second device. When the communication apparatus is the chip disposed in the second device, the communication interface may be an input/output interface.

Optionally, the transceiver may be a transceiver circuit. Optionally, the input/output interface may be an input/output circuit.

According to a twelfth aspect, a processor is provided, and includes an input circuit, an output circuit, and a processing circuit. The processing circuit is configured to receive a signal through the input circuit, and transmit a signal through the output circuit, so that the processor performs the method according to any one of the first aspect to the fifth aspect or the possible implementations of the first aspect to the fifth aspect.

In a specific implementation process, the processor may be one or more chips, the input circuit may be an input pin, the output circuit may be an output pin, and the processing circuit may be a transistor, a gate circuit, a trigger, various logic circuits, and the like. The input signal received by the input circuit may be received and input by, for example, but not limited to, a receiver, the signal output by the output circuit may be output to, for example, but not limited to, a transmitter and transmitted by the transmitter, and the input circuit and the output circuit may be a same circuit, where the circuit is separately used as the input circuit and the output circuit at different moments. Specific implementations of the processor and the various circuits are not limited in this embodiment of this application.

According to a thirteenth aspect, a processing apparatus is provided, and includes a processor and a memory. The processor is configured to read instructions stored in the memory, and may receive a signal through a receiver, and transmit a signal through a transmitter, to perform the method according to any one of the first aspect to the fifth aspect and the possible implementations of the first aspect to the fifth aspect.

Optionally, there are one or more processors and one or more memories.

Optionally, the memory may be integrated with the processor, or the memory and the processor are separately disposed.

In a specific implementation process, the memory may be a non-transitory (non-transitory) memory such as a read-only memory (read only memory, ROM). The memory and the processor may be integrated into a same chip, or may be separately disposed on different chips. A type of the memory and a manner in which the memory and the processor are disposed are not limited in this embodiment of this application.

It should be understood that a related data exchange process such as sending of indication information may be a process of outputting the indication information from the processor, and receiving of capability information may be a process of receiving the input capability information by the processor. Specifically, data output by the processor may be output to the transmitter, and data input by the processor may be from the receiver. The transmitter and the receiver may be collectively referred to as a transceiver.

The processing apparatus in the thirteenth aspect may be one or more chips. The processor in the processing apparatus may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to a fourteenth aspect, a computer program product is provided. The computer program product includes a computer program (which may also be referred to as code or instructions). When the computer program is run, a computer is enabled to perform the method according to any one of the first aspect to the fifth aspect and the possible implementations of the first aspect to the fifth aspect.

According to a fifteenth aspect, a computer-readable storage medium is provided. The computer-readable medium stores a computer program (which may also be referred to as code or instructions). When the computer program is run on a computer, the computer is enabled to perform the method according to any one of the first aspect to the fifth aspect and the possible implementations of the first aspect to the fifth aspect.

According to a sixteenth aspect, a communication system is provided, and includes at least one terminal device above, at least one first device above, and at least one second device above.

DESCRIPTION OF EMBODIMENTS

The following describes technical solutions in this application with reference to accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5th generation (5th generation, 5G) system or a new radio (new radio, NR) system, a wireless local area network (wireless local area network, WLAN) system, a wireless fidelity (Wireless Fidelity, Wi-Fi) system, or a future evolved communication system (for example, a 6G communication system).

Figure 1:
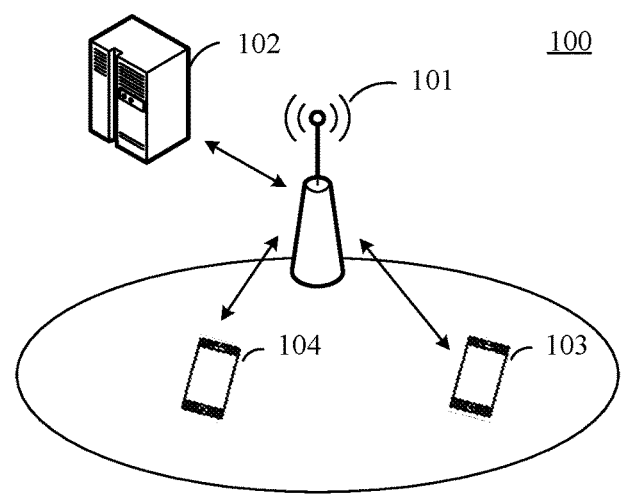
FIG. 1 is a schematic diagram of an architecture of a wireless communication system used in an embodiment of this application.

FIG. 1 is a schematic diagram of an architecture of a wireless communication system used in an embodiment of this application.

The communication system used in this embodiment of this application may include at least one first device. The first device may be an access network device, for example, an access network device 101 shown in FIG. 1. When the first device is the access network device, the first device may be an access network device such as an eNB or a gNB in the communication system, or may be an access network device such as a router or an AP in a WLAN. However, this application is not limited thereto. The communication system used in this embodiment of this application may further include at least one second device. The second device may be a network device that generates data, for example, a server 102 shown in FIG. 1. The server may be directly connected to the first device, or may be indirectly connected to the first device. In other words, the first device and the second device may communicate or exchange data with each other. The second device may alternatively be a terminal device, for example, a terminal device 103 shown in FIG. 1. The terminal device may communicate with the first device through an air interface. The communication system used in this embodiment of this application may further include at least one terminal device that receives data, for example, a terminal device 104 shown in FIG. 1. The terminal device 104 may receive data from the second device (for example, the server 102 or the terminal device 103) by using the access network device 101.

The terminal device in this embodiment of this application may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone (mobile phone), a tablet (pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a 5G network, a terminal device in a future evolved public land mobile network (public land mobile network, PLMN), or the like.

The wearable device may also be referred to as a wearable intelligent device, and is a general term of wearable devices, for example, glasses, gloves, watches, clothes, and shoes, that are developed by applying wearable technologies to intelligent designs of daily wear. The wearable device is a portable device that is directly worn or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In this application, the terminal device may be a terminal in an internet of things (internet of things, IoT) system. An IoT is an important component of future information technology development. A main technical feature of the IoT is connecting an object to a network by using a communication technology, to implement an intelligent network of human-machine interconnection and thing-thing interconnection. The terminal in this application may be a terminal in machine type communication (machine type communication, MTC). The terminal in this application may be an in-vehicle module, an onboard component, an automotive chip, or an on board unit that is built in a vehicle as one or more components or units. The vehicle may implement a method in this application by using the in-vehicle module, the onboard component, the automotive chip, or the on board unit that is built in the vehicle. Therefore, embodiments of this application may be applied to an internet of vehicles, for example, vehicle to everything (vehicle to everything, V2X), long term evolution-vehicle (long term evolution vehicle, LTE-V), and vehicle to vehicle (vehicle to vehicle, V2V).

The terminal device in this application may alternatively be a VR terminal, an AR terminal, or an MR terminal. The VR terminal, the AR terminal, and the MR terminal each may be referred to as an XR terminal. For example, the XR terminal may be a head-mounted device (for example, a helmet or glasses), may be an all-in-one machine, or may be a television, a display, a car, a vehicle-mounted device, a tablet, or a smart screen. The XR terminal can present XR data to the user, and the user can experience diversified XR services by wearing or using the XR terminal. The XR terminal may access the network in a wireless or wired manner, for example, by using Wi-Fi or a 5G system.

It should be understood that a specific form of the terminal device is not limited in this application.

The network device (for example, an access network device) in embodiments of this application may be any device having a wireless transceiver function. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission reception point (transmission and reception point, TRP), or the like. Alternatively, the device may be a gNB or a transmission point (TRP or TP) in a 5G (for example, NR) system or one antenna panel or a group (including a plurality of antenna panels) of antenna panels of a base station in the 5G system, or may be a network node, for example, a baseband unit (BBU) or a distributed unit (distributed unit, DU), that constitutes a gNB or a transmission point.

In some deployments, the gNB may include a central unit (centralized unit, CU) and the DU. The gNB may further include an active antenna unit (active antenna unit, AAU for short). The CU implements a part of functions of the gNB, and the DU implements a part of functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements a part of physical layer processing functions, radio frequency processing, and a function related to an active antenna. Information at the RRC layer is converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

The network device provides a service for a cell. The terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell (metro cell), a micro cell (micro cell), a pico cell (pico cell), a femto cell (femto cell), and the like.

To facilitate understanding of embodiments of this application, terms in this application are first briefly described.

1. Configured Grant (Configured Grant)

The configured grant may also be referred to as grant-free. For example, in an NR communication system, a physical uplink shared channel (physical uplink shared channel, PUSCH) supports grant-free scheduling in addition to dynamic grant scheduling that is based on downlink control information (downlink control information, DCI). To be specific, after a network device configures and activates a PUSCH resource for a terminal device by using radio resource control (radio resource control, RRC) signaling, the terminal device may send uplink data on the configured PUSCH resource without DCI (for example, DCI format 0_0 or DCI format 0_1)-based scheduling. A ConfiguredGrantConfig information element in the RRC signaling is for configuring a grant-free uplink transmission type. Uplink grant-free is classified into the following types:

Configured grant type 1, namely, uplink (uplink, UL) grant type 1, may be denoted as UL grant type 1, and is configured by using RRC signaling. After the RRC configuration takes effect, the terminal device may transmit the PUSCH on a configured grant-free resource. For example, after the RRC configuration takes effect, the terminal device may select, without DCI-based scheduling, the grant-free resource configured by using the RRC signaling, to transmit the PUSCH.

Configured grant type 2, namely, uplink grant type 2, may be denoted as UL grant type 2, and is configured by using RRC signaling. After a configured grant resource is activated by using DCI scrambled by using a configured scheduling-radio network temporary identifier (configured scheduling-radio network temporary identifier, CS-RNTI), the terminal device may transmit the PUSCH on the corresponding configured grant resource. The DCI may indicate, for example, a configured periodicity of using a scheduling resource.

2. Source Coding

Figure 2:
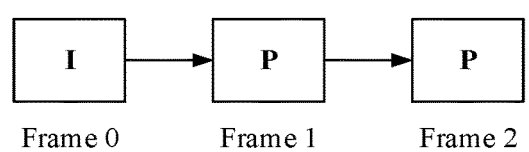
FIG. 2 is a schematic diagram of an example of a data frame encoding reference relationship according to an embodiment of this application.

Data frames (for example, a video frame and an image frame) input into a source encoder may be classified into an I-frame and a P-frame. The I-frame is an independent frame that carries all information, is a data frame that may include a complete picture, occupies large space, and can be decoded independently without referencing another video frame. The first frame in a video sequence is usually the I-frame. The P-frame is an inter-frame predictive coded frame, and needs to be encoded by referencing the I-frame and/or another P-frame. The I-frame and the P-frame each may be referred to as an encoding reference frame, or referred to as a reference frame for short. Encoding of the P-frame depends on a previous reference frame. The P-frame has a higher compression rate, and occupies smaller space. For example, as shown in FIG. 2, frame 0 is an I-frame, a next frame of the I-frame, namely, a P-frame whose frame number is frame 1, is encoded by referencing frame 0, and a next frame of the frame 1, namely, a P-frame whose number is frame 2, is encoded by referencing the P-frame of frame 1.

In the source coding, when a data frame (a P-frame or an I-frame) is transmitted incorrectly or lost, an error occurs when a terminal device decodes a next frame that references the data frame. The error of the next frame further causes an error of a data frame that references the frame and that follows the frame. As a result, a chain reaction of error propagation occurs, and a plurality of subsequent consecutive frames cannot be correctly decoded by the terminal device, and frame freezing, a blank screen, and the like of video footage occur. A problem of the error propagation may be resolved by inserting the I-frame. Errors of a plurality of consecutive frames are avoided by using complete information and a non-error-prone feature of the I-frame. However, a compression rate of the I-frame is low, an amount of encoded data generated by the source coding is large, and transmission efficiency is affected. In this application, the terminal device sends indication information (first indication information and/or third indication information) to indicate an error data frame and/or a data unit in the error data frame (where one data frame may be divided into one or more data units, and there is an encoding reference relationship between the data unit in the data frame and a corresponding data unit in an encoding reference frame of the data frame), and a first device forwards the indication information to a second device that generates a data frame, so that the second device can determine the error data frame and/or the data unit, to change an encoding reference frame of a subsequent data frame or an encoding reference data unit of a part of data units in the subsequent data frame. Correspondingly, the terminal device performs decoding based on a changed encoding reference data frame or encoding reference data unit, so that a case in which a subsequent data frame cannot be correctly decoded due to a transmission error of a data frame can be avoided, and data frame transmission reliability can be improved.

3. Data Frame and Data Unit

Figure 6:
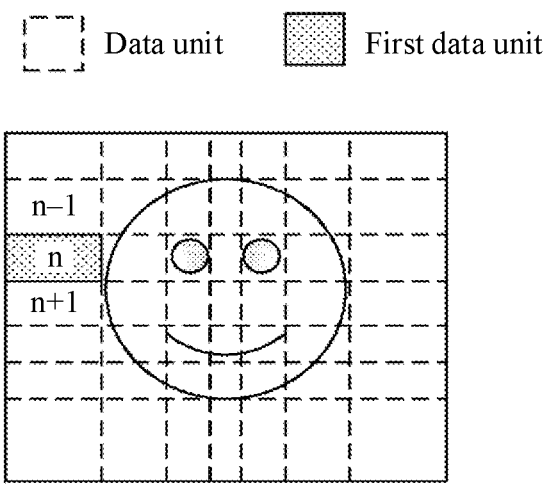
FIG. 6 is a schematic diagram of an example of a data frame and data units according to an embodiment of this application.

In this application, data communication between a second device and a terminal device may be performed in a form of a data frame. For example, communication data is divided into a plurality of data frames, and the second device may send the plurality of data frames to the terminal device, so that the terminal device obtains the communication data including the plurality of data frames. One data frame may include a plurality of data units (for example, as shown in FIG. 6, but not limited thereto), and the data unit is, for example, a codec unit that can be independently encoded and decoded in the data frame. The data unit may include but is not limited to one or more of an image slice (slice), an image tile (tile), a pixel, a tile, or a block. For example, the second device sends video data to the terminal device, and the second device may divide the video data into a plurality of video data frames. For a video data frame, the second device inputs the video data frame into an encoder for encoding, and the encoder encodes the video data frame in data units. Correspondingly, after receiving an encoded video data frame, the terminal device performs decoding in encoded data units to recover the video data frame.

4. First Data Frame, First Protocol Data Packet, and First Communication Data Block When sending the first data frame to a terminal device, a second device may send the first data frame to the terminal device by using a first device. For example, information exchange between the second device and the first device and information exchange between the first device and the terminal device each need to satisfy a format specified in a communication protocol between the devices. The second device may divide the first data frame into one or more first protocol data packets, and send the one or more first protocol data packets to the first device. The first protocol data packet is a protocol data packet that satisfies a format specified in a communication protocol between the first device and the second device. For example, the first protocol data packet may be but is not limited to one or more of the following: a service data adaptation protocol (service data adaptation protocol, SDAP) data packet, a packet data convergence protocol (packet data convergence protocol, PDCP) data packet, a radio link control (radio link control, RLC) data packet, or a media access control (media access control, MAC) data packet.

After receiving the first protocol data packet, the first device may divide the first protocol data packet into one or more first communication data blocks (or referred to as first data blocks), and send the one or more first communication data blocks to the terminal device. The first communication data block is a data block that satisfies a format specified in a communication protocol between the first device and the terminal device. For example, the first data block may be a transport block (transport block, TB) or a code block (code block, CB) in a communication system, or the first data block may be a wireless data packet (data packet) in a wireless local area network system. However, this application is not limited thereto.

The following describes communication methods provided in embodiments of this application in detail with reference to the accompanying drawings.

Figure 3A:
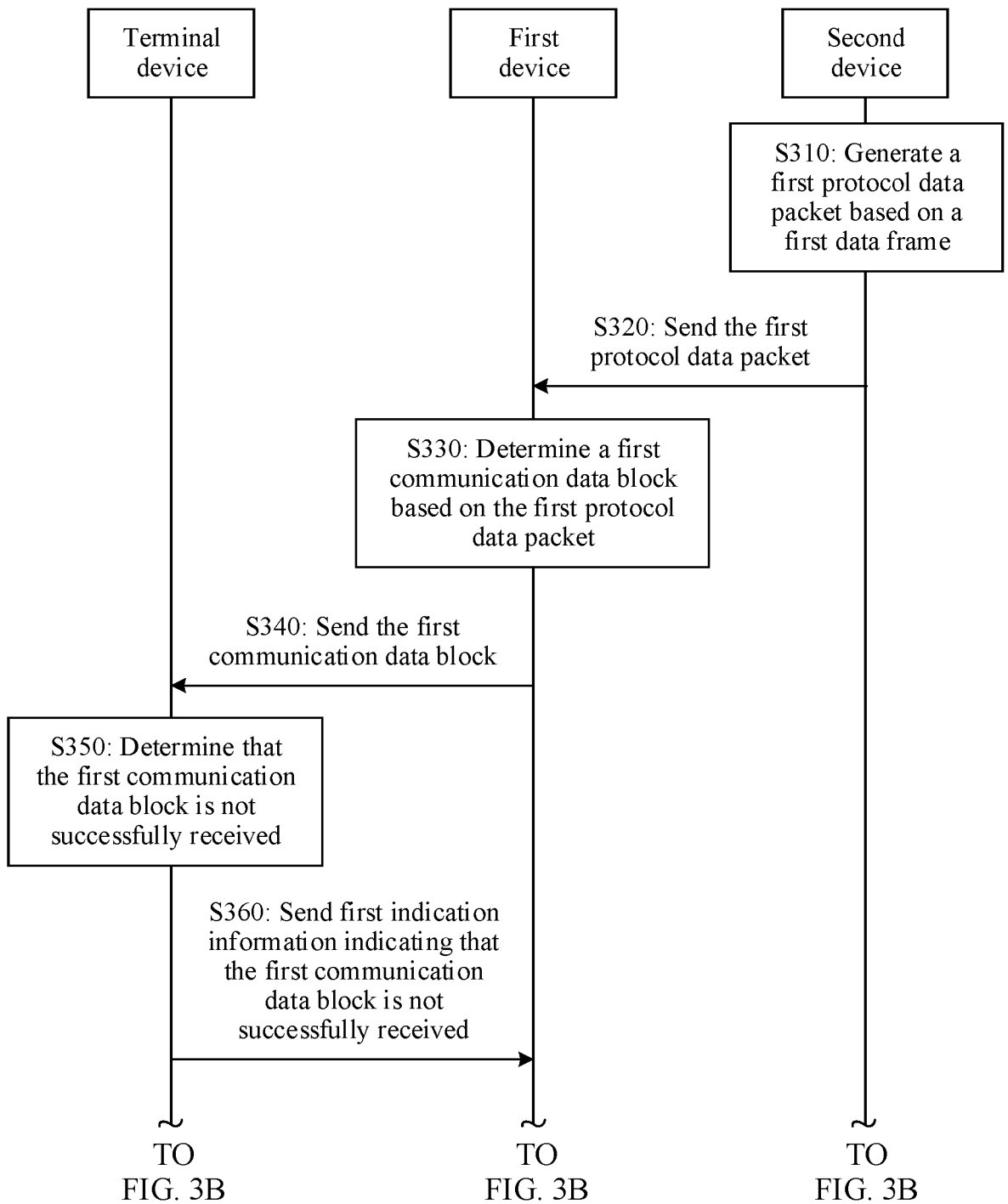
FIG. 3A and FIG. 3B are a schematic flowchart of a communication method according to an embodiment of this application.
Figure 3B:
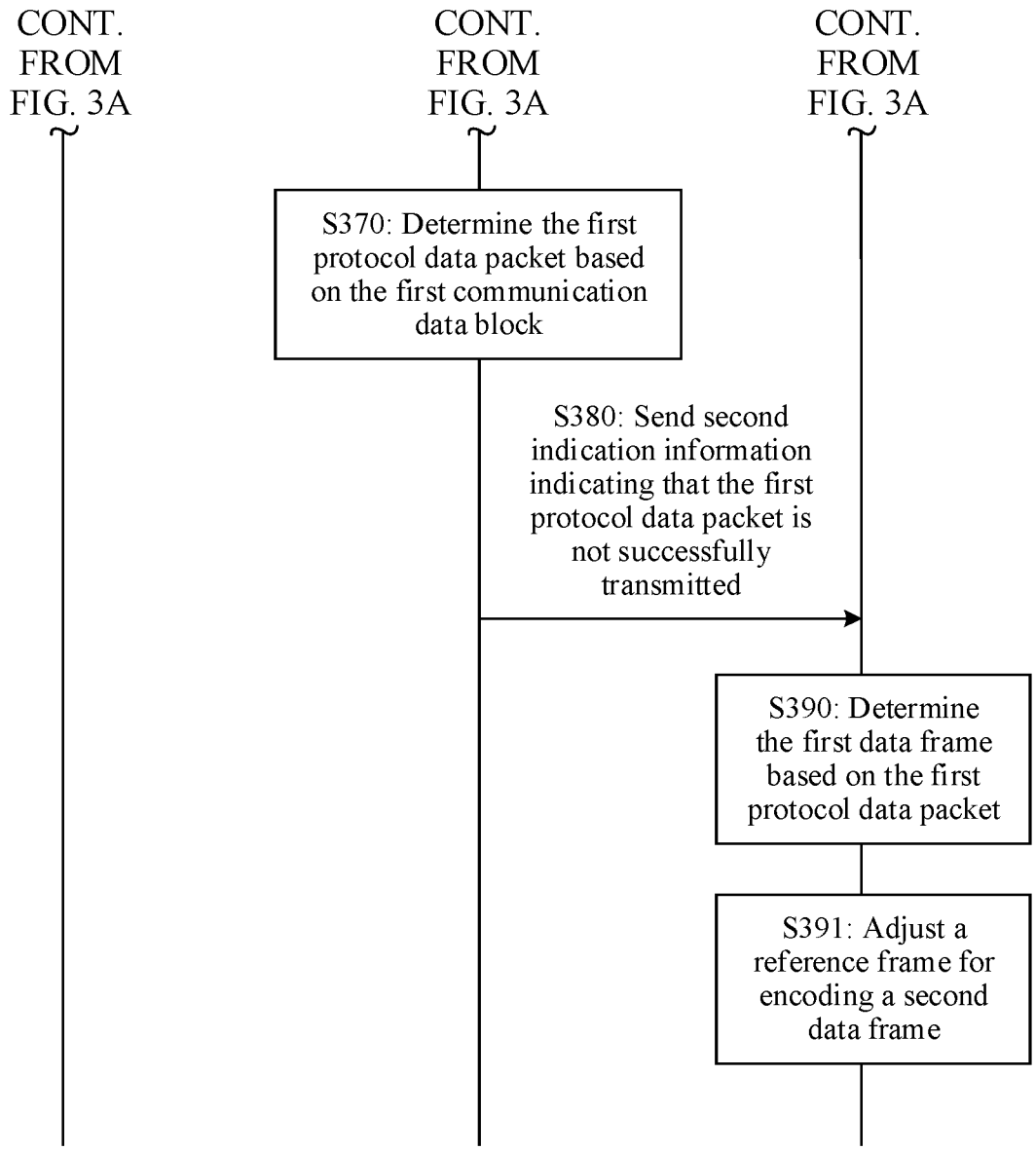

FIG. 3A and FIG. 3B are a schematic flowchart of a communication method according to an embodiment of this application.

S310: A second device generates a first protocol data packet based on a first data frame.

The second device sends the first data frame to a terminal device by using a first device. After encoding a data frame, the second device may generate one or more first protocol data packets based on the encoded data frame, and send the first protocol data packet to the first device in S320. The first protocol data packet may be a protocol data packet between the second device and the first device.

By way of example but not limitation, the first protocol data packet may be one or more of the following:
an SDAP data packet, a PDCP data packet, an RLC data packet, or a MAC data packet.

Optionally, the second device may specifically first generate one or more internet protocol (internet protocol, IP) data packets based on the encoded data packet, and then generate the one or more first protocol data packets based on the IP data packet. The IP data packet may be a protocol data packet between the second device and the terminal device.

S320: The second device sends the first protocol data packet to the first device.

Correspondingly, the first device receives the first protocol data packet from the second device.

S330: The first device determines a first communication data block based on the first protocol data packet.

After receiving the first protocol data packet, the first device determines that the first protocol data packet needs to be sent to the terminal device, and the first device generates one or more communication data blocks between the first device and the terminal device based on the first protocol data packet. For example, the communication data block may be a transport block (transport block, TB) or a code block (code block, CB), or may be a wireless data packet (data packet) in a Wi-Fi system. The first device divides the first protocol data packet into a plurality of communication data blocks, and the plurality of communication data blocks include the first communication data block.

S340: The first device sends the first communication data block to the terminal device.

Correspondingly, the terminal device receives the first communication data block.

S350: The terminal device determines that the first communication data block is not successfully received.

For example, the first communication data block may be sent to the terminal device after the first device performs channel encoding on the first communication data block. If the terminal device fails to decode received encoded data, the terminal device determines that the first communication data block is not successfully received. However, this application is not limited thereto.

For another example, the first device sends the first communication data block to the terminal device after adding a cyclic redundancy check bit to the first communication data block. If the terminal device fails to perform cyclic redundancy check, the terminal device determines that the first communication data block is not successfully received. However, this application is not limited thereto.

S360: The terminal device sends first indication information to the first device, where the first indication information indicates that the first communication data block is not successfully received.

Correspondingly, the first device receives the first indication information from the terminal device.

Optionally, the first indication information may be a physical-layer hybrid automatic repeat request (hybrid automatic repeat request, HARQ) feedback. For example, if the first indication information is a negative acknowledgment (negative-acknowledgment, NACK), it indicates that the first communication data block is not successfully received.

S370: The first device determines the first protocol data packet based on the first communication data block.

If the first device determines that the first communication data block is one of the one or more communication data blocks obtained by dividing the first protocol data packet, in other words, the first protocol data packet includes data in the first communication data block, the first device determines that the first protocol data packet is not successfully transmitted or is incorrectly transmitted. The first device notifies the second device in S380.

For example, if the first protocol data packet received by the first device from the second device is the SDAP data packet, and the first device determines, based on the first communication data block, that the data in the first communication data block is data in the SDAP data packet, the first device determines that the SDAP data packet is not successfully transmitted or is incorrectly transmitted.

S380: The first device sends second indication information to the second device, where the second indication information indicates that the first protocol data packet is not successfully transmitted.

Correspondingly, the second device receives the second indication information from the first device.

Optionally, the second indication information may include an identifier of the first protocol data packet.

Optionally, the first device is a base station or an access network device, the second device is a server, and the base station or the access network device may send the second indication information to the server by using a core network control plane function node.

S390: The second device determines the first data frame based on the first protocol data packet.

The second device determines that the first protocol data packet is one protocol data packet in the one or more first protocol data packets obtained by dividing the first data frame. In other words, the second device determines that the first data frame includes data in the first protocol data packet.

S391: The second device adjusts a reference frame for encoding a second data frame.

The second device originally needs to reference the first data frame to encode the second data frame. That is, the first data frame is the reference frame of the second data frame. After determining that the first data frame includes data that is not successfully transmitted, the second device adjusts the reference frame for encoding the second data frame to a third data frame. Correspondingly, after receiving the second data frame, the terminal device references the third data frame to decode the second data frame.

Optionally, the third data frame may be a data frame that is before the first data frame.

Optionally, a data frame referenced by encoding of the second data frame when the first data frame is not transmitted successfully is specified in a protocol or preconfigured. For example, when the first data frame is not successfully transmitted, it is predefined that the second data frame is encoded by referencing a data frame (namely, the third data frame) that is successfully received by the terminal device and that is before the first data frame and closest to the first data frame. Alternatively, the terminal device indicates, to the second device, the data frame referenced when the terminal device encodes the second data frame, or the second device indicates, to the terminal device, the data frame referenced when the second device encodes the second data frame. For example, an identifier of the third data frame may be indicated. However, this application is not limited thereto.

Figure 4:
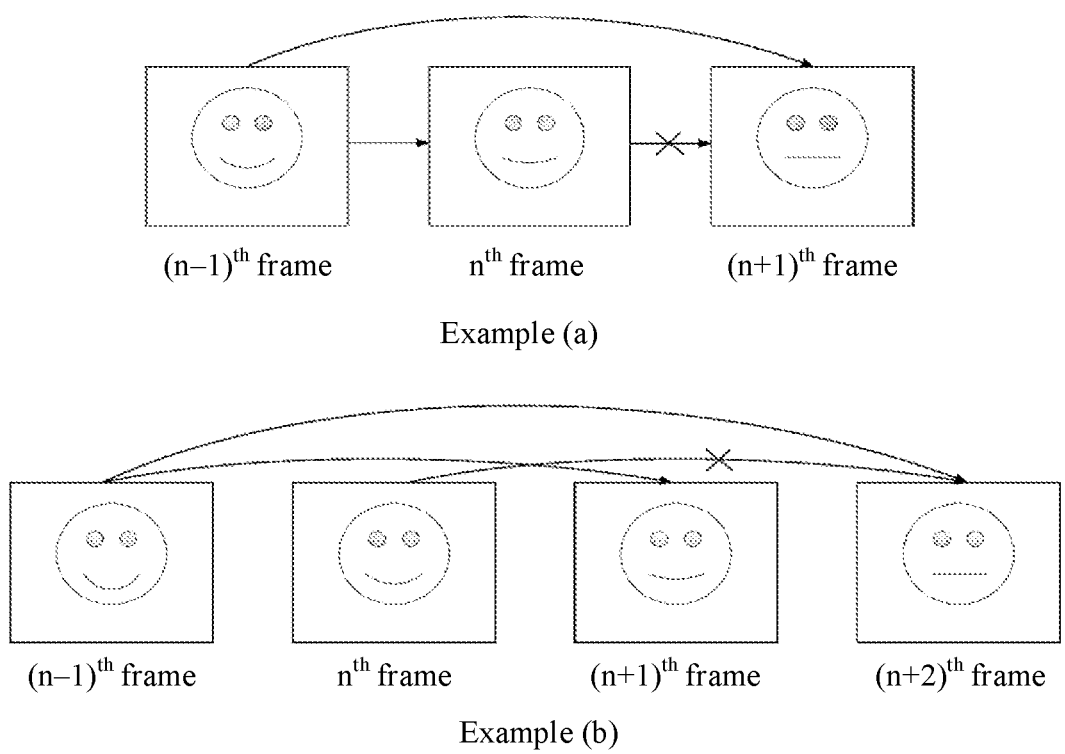
FIG. 4 is a schematic diagram of an example of a communication method according to an embodiment of this application.

For example, as shown in Example (a) in FIG. 4, the first data frame is an $n^{th}$ video frame (for example, an $n^{th}$ frame in the figure) in video frames, and an $(n+1)^{th}$ video frame (for example, an $(n+1)^{th}$ frame in the figure, namely, the second data frame) is encoded by originally referencing the $n^{th}$ video frame. After the second device determines that the first data frame includes the data that is not unsuccessfully transmitted, the second device references an $(n-1)^{th}$ video frame (for example, an $(n-1)^{th}$ frame in the figure, namely, the third data frame) to encode the $(n+1)^{th}$ video frame, where the $(n-1)^{th}$ video frame is a video frame successfully received by the terminal device. Correspondingly, after receiving the $(n+1)^{th}$ video frame, the terminal device references the $(n-1)^{th}$ video frame to decode the $(n+1)^{th}$ video frame. For another example, as shown in Example (b) in FIG. 4, the first data frame is an $n^{th}$ video frame (for example, an $n^{th}$ frame in the figure) in video frames. The second device originally references the $n^{th}$ video frame to encode an $(n+2)^{th}$ video frame (for example, an $(n+2)^{th}$ frame in the figure, namely, the second data frame), adjusts the reference frame of the $(n+2)^{th}$ video frame after determining that the $n^{th}$ video frame includes the data that is not successfully transmitted, and references an $(n-1)^{th}$ video frame (for example, an $(n-1)^{th}$ frame in the figure, namely, the third data frame) to encode the $(n+2)^{th}$ video frame, where the $(n-1)^{th}$ video frame is a video frame successfully received by the terminal device. Correspondingly, after receiving the $(n+2)^{th}$ video frame, the terminal device references the $(n-1)^{th}$ video frame to decode the $(n+2)^{th}$ video frame.

It should be noted that the foregoing examples are described in a case in which a reference frame obtained through adjustment is a previous data frame of an original reference frame. However, this application is not limited thereto. A reference frame obtained through adjustment may alternatively be another data frame that is successfully received by the terminal device and that is before the first data frame.

According to the foregoing solution, the terminal device notifies the first device that the first transport block is not successfully received, so that the first device determines the corresponding first protocol data packet. In this way, the second device can adjust the reference data frame of the second data frame. This can avoid a case in which an error occurs in subsequent data frame transmission because a data unit in a data frame is not successfully transmitted, and improve data frame transmission reliability.

Figure 5:
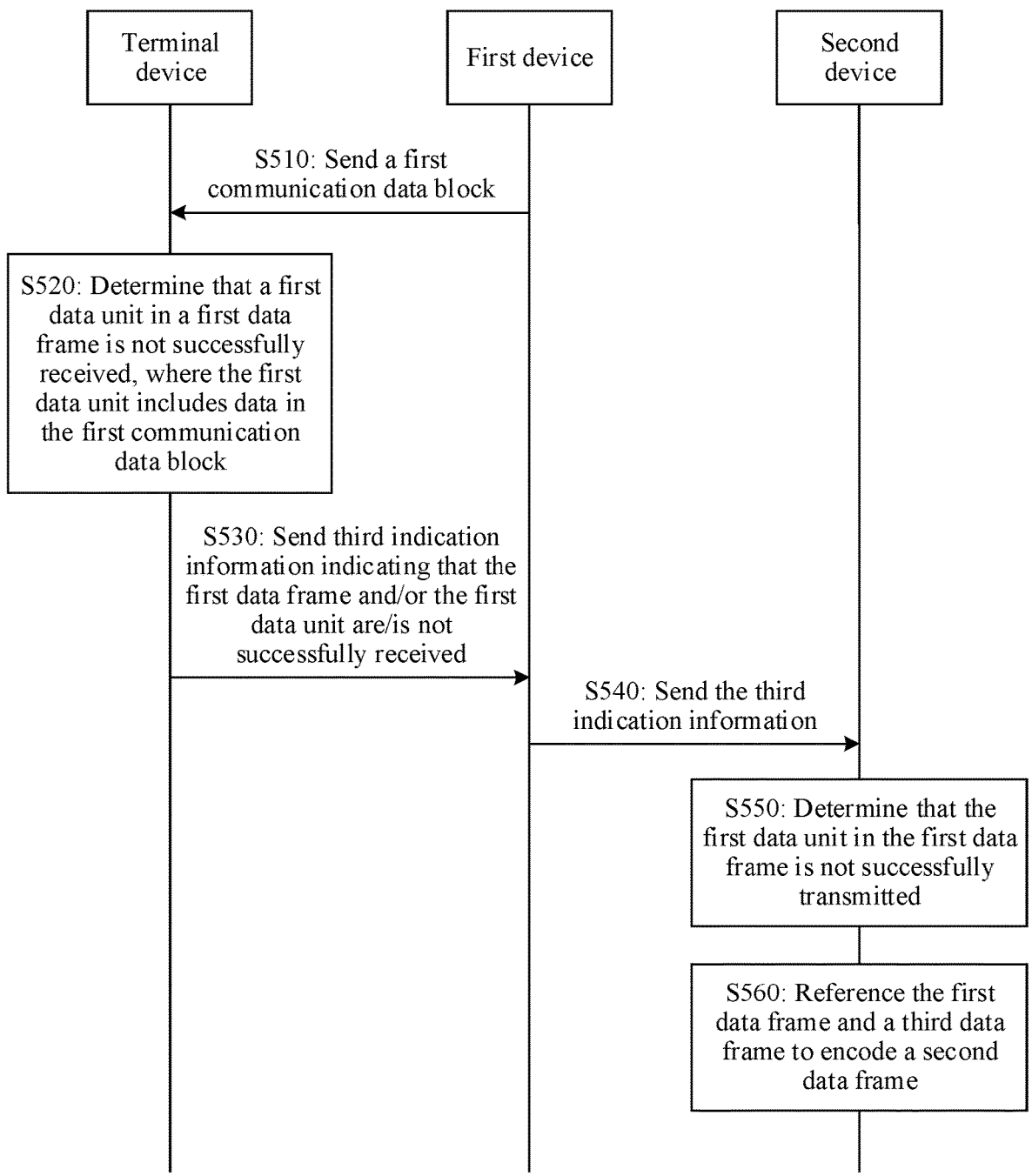
FIG. 5 is another schematic flowchart of a communication method according to an embodiment of this application.

FIG. 5 is another schematic flowchart of a communication method according to an embodiment of this application.

In FIG. 5, for steps before S510, refer to steps before S340 in FIG. 3A and FIG. 3B.

S510: The first device sends the first communication data block to the terminal device.

Correspondingly, the terminal device receives the first communication data block from the first device.

S520: The terminal device determines that a first data unit in the first data frame is not successfully received, where the first data unit includes data in the first communication data block.

The terminal device receives the first communication data block and determines that the first communication data block is not successfully received. For example, if the terminal device fails to perform channel decoding or CRC check on the first communication data block, the terminal device determines that the first transport block is not successfully received. The terminal device determines the first data unit including the data in the first communication data block and determines that the first data unit is a data unit in the first data frame. The first data frame may include one first data unit. That is, one data unit in the first data frame includes the data in the first communication data block. The first data frame may alternatively include a plurality of first data units. That is, the first data frame includes a plurality of data units including the data in the first communication data block. This is not limited in this application.

One data frame includes at least one data unit, and one data unit may be independently encoded and decoded. Sizes of different data units may be the same or, in some embodiments, may be different. This is not limited in this application.

For example, a first data frame shown in FIG. 6 includes a plurality of data units. Before sending the first data frame, the second device independently encodes each data unit in the first data frame. Correspondingly, the terminal device may independently decode the data unit. If the terminal device determines, after determining that the first communication data block is not successfully received, that an $n^{th}$ data unit (namely, the first data unit) in the first data frame includes the data in the first communication data block, the terminal device determines that the $n^{th}$ data unit is not successfully transmitted.

By way of example but not limitation, the data unit may be one or more of the following:

an image slice (slice), an image tile (tile), a pixel, a tile, or a block.

S530: The terminal device sends third indication information to the first device, where the third indication information indicates that the first data frame and/or the first data unit are/is not successfully received.

Correspondingly, the first device receives the third indication information.

Optionally, the third indication information includes an identifier of the first data frame and/or an identifier of the first data unit.

Optionally, the third indication information is carried on an uplink configured grant resource. By way of example but not limitation, the uplink configured grant resource may be an uplink configured grant resource of type 1, or may be an uplink configured grant resource of type 2.

Optionally, the third indication information is carried on a semi-persistent scheduling (semi-persistent scheduling, SPS) resource.

According to the foregoing solution, the third indication information is carried on a grant-free (uplink configured grant or SPS) resource, so that a delay caused because the terminal device sends a scheduling request (scheduling request, SR), receives an uplink grant (UL grant) sent by the first device, and then determines a resource for transmitting the third indication information can be reduced, and a low-delay requirement of an XR service is satisfied.

S540: The first device sends the third indication information to the second device.

Correspondingly, the second device receives the third indication information from the first device.

Optionally, the first device transparently transmits (transparent transmission) the third indication information. For example, after receiving the third indication information, the first device does not decode the third indication information, and may send the third indication information to the second device after performing interface information format conversion.

Optionally, the third indication information is an application layer message sent by the terminal device.

For example, the third indication information is a transmission control protocol (transmission control protocol, TCP) message sent by the terminal device, and is transparently transmitted by the first device to the second device.

Optionally, the first device sends the third indication information to the second device by using a core network user plane function node.

Optionally, layered data encoding is used for a data frame, and the third indication information further indicates that the first data frame is a data frame at a first coding layer in the layered data encoding.

In an implementation, the layered data encoding may be scalable video coding (scalable video coding, SVC) or scalability extension of high efficiency video coding (scalability extension of high efficiency video coding, SHVC). For specific implementation of the SVC, refer to the H.264 standard specified by the international organization for standardization (international organization for standardization, ISO) and the international telecommunication union (international telecommunication union, ITU). For specific implementation of the SHVC, refer to the H.265 standard specified by the ISO and the ITU. By way of example but not limitation, the first coding layer may be an enhancement layer or a base layer.

In another implementation, the layered data encoding may be multi-view video coding. By way of example but not limitation, the first coding layer is a data layer inside a field of view (field of view, FOV) or a data layer outside the FOV.

It should be noted that the coding layer in this application may also be referred to as a coding flow, and descriptions related to a "layer" in data encoding in this application may be replaced with a "flow".

S550: The second device determines that the first data unit in the first data frame is not successfully transmitted.

After receiving the third indication information, the second device determines that the first data frame and/or the first data unit in the first data frame are/is not successfully transmitted.

Optionally, the third indication information further indicates that the first data frame is the data frame at the first coding layer. The second device determines, based on the third indication information, that the first data frame is the data frame at the first coding layer, and adjusts, in S560, a reference data unit of a data unit that is encoded by originally referencing the first data unit at the first coding layer.

S560: The second device references the first data frame and a third data frame to encode a second data frame.

The second device originally references the first data frame to encode the second data frame. After determining that the first data unit in the first data frame is not successfully transmitted, the second device references the first data frame and the third data frame to encode the second data frame. The third data frame may be a data frame that is successfully received by the terminal device and that is before the first data frame.

Figure 7:
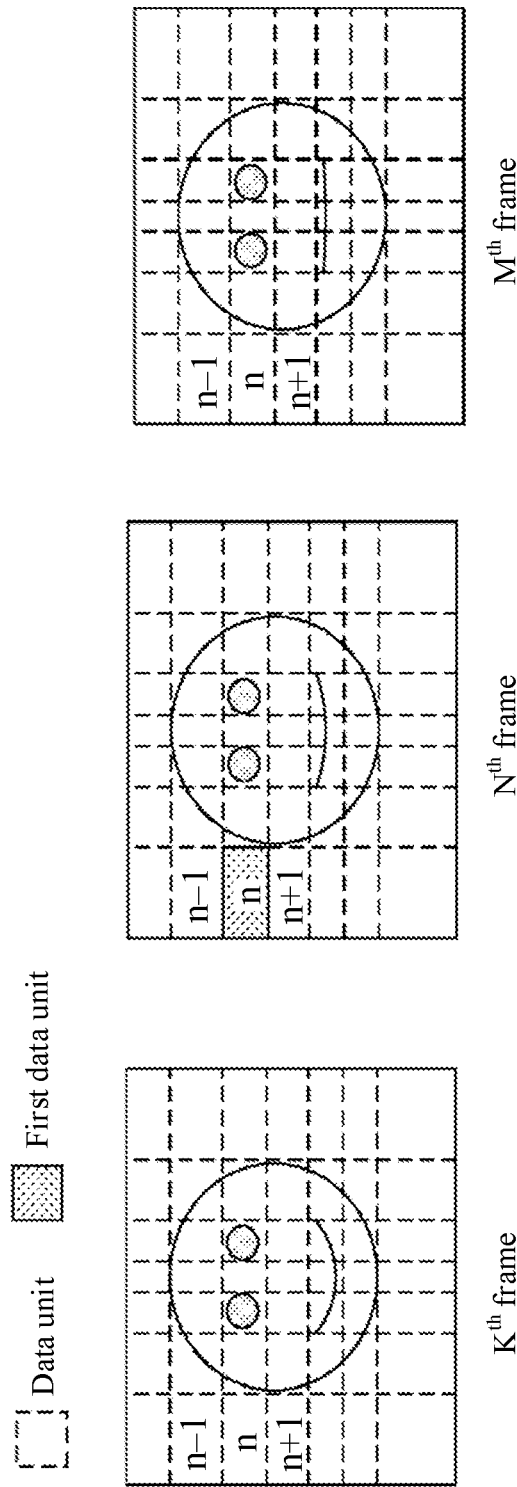
FIG. 7 is a schematic diagram of another example of a communication method according to an embodiment of this application.

Optionally, the second device references a second data unit in the first data frame and a third data unit in the third data frame to encode the second data frame. The second data unit is a data unit other than the first data unit in the first data frame, and the third data unit corresponds to the first data unit. The second data unit is all data units other than the first data unit in the first data frame, or the second data unit is a part of data units other than the first data unit in the first data frame. For example, as shown in FIG. 7, the third indication information indicates that an $n^{th}$ data unit (namely, the first data unit) in an $N^{th}$ data frame (namely, the first data frame) is not successfully received. After receiving the third indication information, the second device determines that the $n^{th}$ data unit in the $N^{th}$ frame is not successfully transmitted. In this case, the second device adjusts a reference data unit of an $M^{th}$ data frame. For example, the $M^{th}$ data frame is encoded by referencing a $K^{th}$ data frame and the $N^{th}$ data frame. Optionally, an $n^{th}$ data unit in the $M^{th}$ data frame is encoded by originally referencing the $n^{th}$ data unit in the $N^{th}$ data frame. Because the $n^{th}$ data unit in the $N^{th}$ data frame is not successfully transmitted, the terminal device cannot reference the $n^{th}$ data unit in the $N^{th}$ data frame to perform decoding. Therefore, the second device references an $n^{th}$ data unit in the $K^{th}$ data frame to encode the $n^{th}$ data unit in the $M^{th}$ data frame. If data units (namely, the second data unit) other than the first data unit in the $N^{th}$ data frame are all successfully transmitted, other data units in the $M^{th}$ data frame are encoded by referencing the data units (namely, the second data unit) other than the first data unit in the $N^{th}$ data frame. For example, an $(n-1)^{th}$ data unit in the $M^{th}$ data frame is encoded by referencing an $(n-1)^{th}$ data unit (namely, an example of the second data unit) in the $N^{th}$ data frame, and an $(n+1)^{th}$ data unit in the $M^{th}$ data frame is encoded by referencing an $(n+1)^{th}$ data unit (namely, another example of the second data unit) in the $N^{th}$ data frame. However, this application is not limited thereto.

For another example, in FIG. 7, a reference frame of an $M^{th}$ data frame is an $N^{th}$ data frame, and an $(n-1)^{th}$ data unit, an $n^{th}$ data unit, and an $(n+1)^{th}$ data unit in the $M^{th}$ data frame all need to reference an $n^{th}$ data unit (namely, the first data unit) in the $N^{th}$ data frame. In this case, the second device adjusts the reference data unit of the $(n-1)^{th}$, the $n^{th}$, and the $(n+1)^{th}$ data units in the $M^{th}$ data frame, and performs encoding by using an $n^{th}$ data unit in a $K^{th}$ data frame as a reference data unit. Other data units that are in the $M^{th}$ data frame and that are encoded without referencing the $n^{th}$ data unit in the $N^{th}$ data frame are encoded by referencing an original reference data unit. However, this application is not limited thereto.

Optionally, a data frame referenced by encoding of the second data frame or a data unit referenced by encoding of the second data unit when a data unit in the first data frame is not transmitted successfully is specified in a protocol or preconfigured in a system. For example, when the first data unit in the first data frame is not successfully transmitted, it is predefined that a corresponding data unit (namely, a data unit encoded by referencing the first data unit) in the second data frame is encoded by referencing a corresponding data unit in a data frame (namely, the third data frame) that is successfully received by the terminal device and that is before the first data frame and closest to the first data frame. The third data frame may be a data frame in which all data units are successfully received by the terminal device and that is before the first data frame and closest to the first data frame. Alternatively, the third data frame may be a data frame that is before the first data frame and closest to the first data frame, all data units corresponding to the first data unit in the data frame are successfully received by the terminal device, and whether other data units are successfully received is not limited. Alternatively, the terminal device indicates, to the second device, the data frame referenced when the terminal device encodes the second data frame, or the second device indicates, to the terminal device, the data frame referenced when the second device encodes the second data frame. For example, an identifier of the third data frame may be indicated. However, this application is not limited thereto.

According to the foregoing solution, when the second device determines, by using the third indication information, that the first data unit in the first data frame is not successfully transmitted, the second device adjusts the reference data unit of the data unit that is in the second data frame and that is encoded by originally referencing the first data unit, and performs encoding by referencing a corresponding data unit in the third data unit. This can avoid a case in which an error occurs in subsequent data frame transmission because a data unit in a data frame is not successfully transmitted. In addition, the other data units in the first data frame are still used as reference data units for encoding other data units in the second data frame, so that a small code compression rate can be maintained while continuous errors in transmission are reduced.

Figure 8:
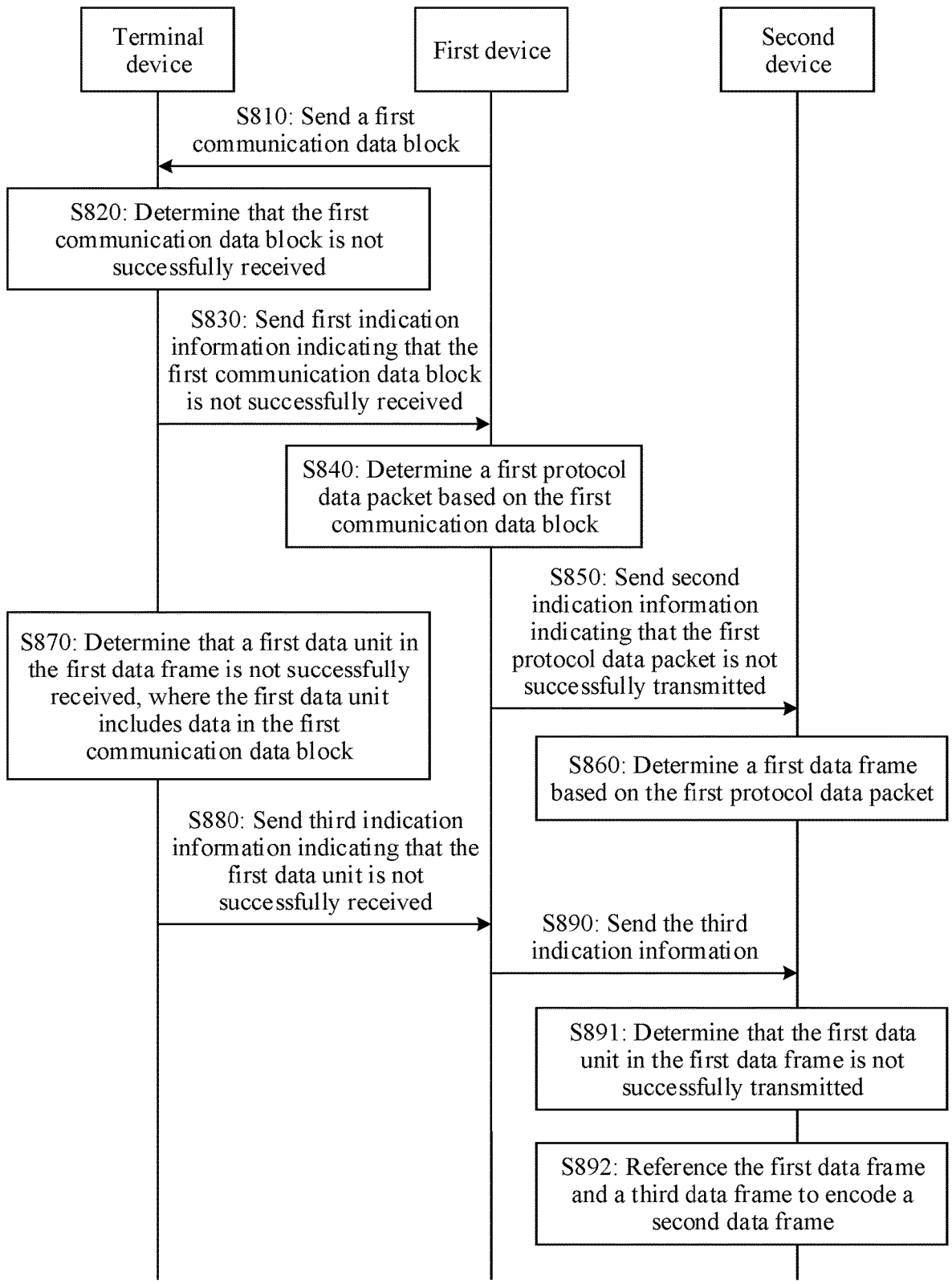
FIG. 8 is another schematic flowchart of a communication method according to an embodiment of this application.

In an implementation, the embodiment in FIG. 3A and FIG. 3B may alternatively be implemented in combination with the embodiment in FIG. 5. For example, FIG. 8 is another schematic flowchart of a communication method according to an embodiment of this application.

After receiving a first transport block in S810, a terminal device determines, in S820, that the first transport block is not successfully transmitted. The terminal device sends first indication information to a first device in S830, where the first indication information indicates that the terminal device does not successfully receive the first transport block.

After receiving the first indication information, the first device determines, in S840, a first protocol data packet corresponding to the first transport block, where the first protocol data packet includes data in the first transport block. The first device sends second indication information to a second device in S850, where the second indication information indicates that the first protocol data packet is not successfully transmitted.

After receiving the second indication information, the second device determines, in S860, a first data frame corresponding to the first protocol data packet, where the first data frame includes data in the first protocol data packet. That is, the second device determines that the first data frame includes data that is not successfully transmitted. In other words, the second device can determine, through feedbacks of the terminal device and the first device, the first data frame including the data that is not successfully transmitted.

After determining that the first transport block is not successfully received, the terminal device determines, in S870, a first data unit in the first data frame corresponding to the first transport block, where the first data unit includes the data in the first transport block. It should be noted that the terminal device may perform S870 after S820 or S830. A time sequence of step S870 and steps S840, S850, and S860 is not limited in this application. Sequence numbers of the processes do not mean an execution sequence in this embodiment of this application. The execution sequence of the processes should be determined according to functions and internal logic of the processes and should not be construed as any limitation on the implementation processes of this embodiment of this application.

In S880, the terminal device sends third indication information to the first device, where the third indication information indicates that the first data unit is not successfully received. Optionally, layered encoding is used for the data frame, and the third indication information further indicates that the first data frame is a data frame at a first coding layer.

After receiving the third indication information, the first device sends the third indication information to the second device in S890.

After receiving the third indication information, the second device determines, in S891, the first data unit that is in the first data frame and that is not successfully transmitted. A second data frame is encoded by referencing the first data frame and a third data frame in S892. Optionally, the third indication information further indicates that the first data frame is the data frame at the first coding layer, and the second device references the first data frame at the first coding layer and the third data frame at the first coding layer to encode the second data frame at the first coding layer.

In other words, the second device determines, through a two-step feedback of the terminal device, a data unit that is not successfully transmitted, so that the data unit that is not successfully transmitted can be avoided to encode a data unit in a subsequent data frame. Usually, that the first transport block is not successfully received may be determined through data processing at a physical layer of the terminal device, and the terminal device performs a first-step feedback in time, so that the second device can determine, as soon as possible, a data frame that is not successfully transmitted. A higher layer of the terminal device may further determine the first data unit corresponding to the first transport block, and the terminal device notifies the second device in a second-step feedback, so that the second device can avoid the first data unit to encode the subsequent data frame. According to the solution provided in this application, data transmission reliability can be effectively improved when a service delay requirement is satisfied.

It should be understood that sequence numbers of the processes do not mean an execution sequence in the foregoing embodiments. The execution sequence of the processes should be determined according to functions and internal logic of the processes and should not be construed as any limitation on the implementation processes of embodiments of this application. For example, in some embodiments two indication information (previously referred to as the first indication information and the third indication information) may be used.

The methods provided in embodiments of this application are described above in detail with reference to FIG. 3A to FIG. 8. Apparatuses provided in embodiments of this application are described below in detail with reference to FIG. 9 to FIG. 12.

Figure 9:
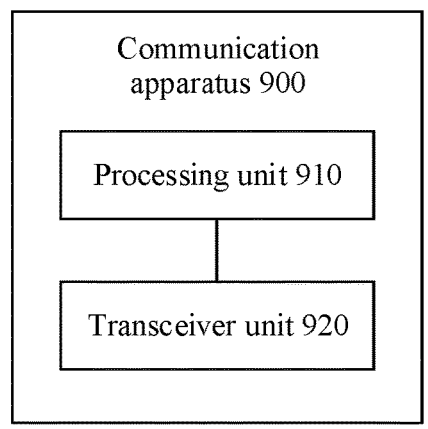
FIG. 9 is a schematic block diagram of an example of a communication apparatus according to of this application.

FIG. 9 is a schematic block diagram of a communication apparatus according to an embodiment of this application. As shown in FIG. 9, the communication apparatus 900 may include a processing unit 910 and a transceiver unit 920.

In a possible design, the communication apparatus 900 may correspond to the terminal device in the foregoing method embodiments. For example, the communication apparatus 900 may be a terminal device or a chip disposed in the terminal device.

It should be understood that the communication apparatus 900 may correspond to the terminal device in the methods 300, 500, and 800 according to embodiments of this application. The communication apparatus 900 may include units configured to perform the methods performed by the terminal device in the methods 300, 500, and 800 in FIG. 3A, FIG. 3B, FIG. 5, and FIG. 8. In addition, the units in the communication apparatus 900 and the foregoing other operations and/or functions are separately for implementing the corresponding procedures of the methods 300, 500, and 800 in FIG. 3A, FIG. 3B, FIG. 5, and FIG. 8.

It should be understood that a specific process in which the units perform the foregoing corresponding steps has been described in detail in the foregoing method embodiments.

Figure 10:
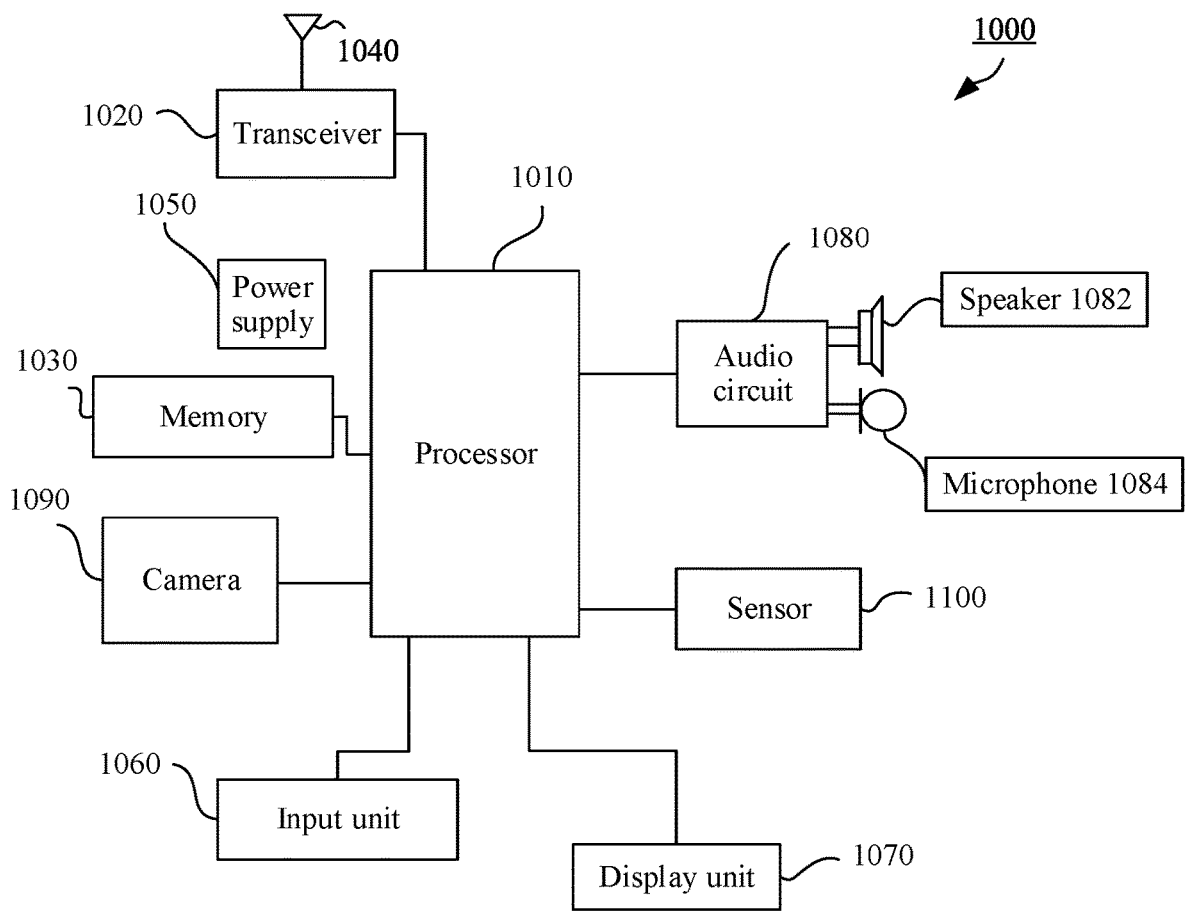
FIG. 10 is a schematic diagram of a structure of an example of a terminal device according to this application.

It should be further understood that, when the communication apparatus 900 is the terminal device, the transceiver unit 920 in the communication apparatus 900 may correspond to a transceiver 1020 in a terminal device 1000 shown in FIG. 10, and the processing unit 910 in the communication apparatus 900 may correspond to a processor 1010 in the terminal device 1000 shown in FIG. 10.

It should be further understood that, when the communication apparatus 900 is the terminal device, the transceiver unit 920 in the communication apparatus 900 may be implemented by using a communication interface (for example, a transceiver or an input/output interface), for example, may correspond to the transceiver 1020 in the terminal device 1000 shown in FIG. 10.

The processing unit 910 in the communication apparatus 900 may be implemented by using at least one processor, for example, may correspond to the processor 1010 in the terminal device 1000 shown in FIG. 10. The processing unit 910 in the communication apparatus 900 may alternatively be implemented by using at least one logic circuit.

Optionally, the communication apparatus 900 may further include the processing unit 910. The processing unit 910 may be configured to process instructions or data, to implement a corresponding operation.

Optionally, the communication apparatus 900 may further include a storage unit. The storage unit may be configured to store instructions or data. The processing unit may invoke the instructions or the data stored in the storage unit, to implement a corresponding operation.

In another possible design, the communication apparatus 900 may correspond to the first device in the foregoing method embodiments. For example, the communication apparatus 900 may be a first device or a chip disposed in the first device.

It should be understood that the communication apparatus 900 may correspond to the first device in the methods 300, 500, and 800 according to embodiments of this application. The communication apparatus 900 may include units configured to perform the methods performed by the first device in the methods 300, 500, and 800 in FIG. 3A, FIG. 3B, FIG. 5, and FIG. 8. In addition, the units in the communication apparatus 900 and the foregoing other operations and/or functions are separately for implementing the corresponding procedures of the methods 300, 500, and 800 in FIG. 3A, FIG. 3B, FIG. 5, and FIG. 8. It should be understood that a specific process in which the units perform the foregoing corresponding steps has been described in detail in the foregoing method embodiments.

Figure 11:
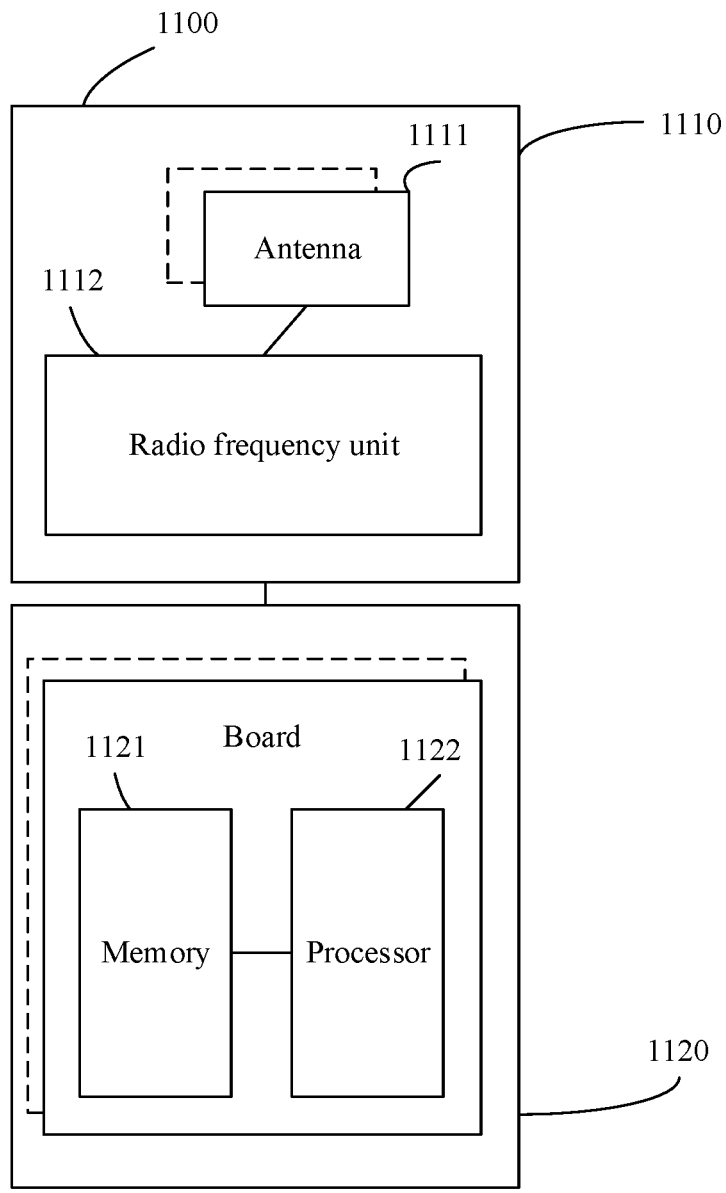
FIG. 11 is a schematic diagram of a structure of an example of a first device according to this application.

It should be further understood that, when the communication apparatus 900 is the first device, the transceiver unit in the communication apparatus 900 may correspond to a transceiver 1110 in a first device 1100 shown in FIG. 11, and the processing unit 910 in the communication apparatus 900 may correspond to a processor 1122 in the first device 1100 shown in FIG. 11.

Optionally, the communication apparatus 900 may further include the processing unit 910. The processing unit 910 may be configured to process instructions or data, to implement a corresponding operation.

Optionally, the communication apparatus 900 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps has been described in detail in the foregoing method embodiments.

It should be further understood that, when the communication apparatus 900 is the first device, the transceiver unit 920 in the communication apparatus 900 may be implemented by using a communication interface (for example, a transceiver or an input/output interface), for example, may correspond to the transceiver 1110 in the first device 1100 shown in FIG. 11. The processing unit 910 in the communication apparatus 900 may be implemented by using at least one processor, for example, may correspond to the processor 1122 in the first device 1100 shown in FIG. 11. The processing unit 910 in the communication apparatus 900 may be implemented by using at least one logic circuit.

In another possible design, the communication apparatus 900 may correspond to the second device in the foregoing method embodiments. For example, the communication apparatus 900 may be a second device or a chip disposed in the second device.

It should be understood that the communication apparatus 900 may correspond to the second device in the methods 300, 500, and 800 according to embodiments of this application. The communication apparatus 900 may include units configured to perform the methods performed by the second device in the methods 300, 500, and 800 in FIG. 3A, FIG. 3B, FIG. 5, and FIG. 8. In addition, the units in the communication apparatus 900 and the foregoing other operations and/or functions are separately for implementing the corresponding procedures of the methods 300, 500, and 800 in FIG. 3A, FIG. 3B, FIG. 5, and FIG. 8. It should be understood that a specific process in which the units perform the foregoing corresponding steps has been described in detail in the foregoing method embodiments.

Figure 12:
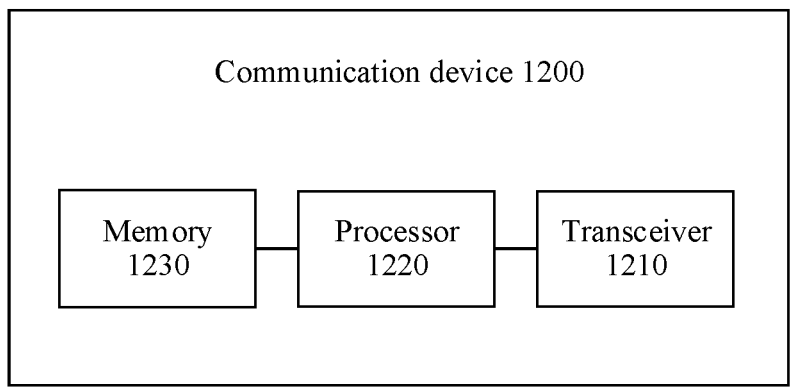
FIG. 12 is a schematic diagram of a structure of an example of a second device according to this application.

It should be further understood that, when the communication apparatus 900 is the second device, the transceiver unit in the communication apparatus 900 may correspond to a transceiver 1210 in a second device 1200 shown in FIG. 12, and the processing unit 910 in the communication apparatus 900 may correspond to a processor 1220 in the second device 1200 shown in FIG. 12.

Optionally, the communication apparatus 900 may further include the processing unit 910. The processing unit 910 may be configured to process instructions or data, to implement a corresponding operation.

Optionally, the communication apparatus 900 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps has been described in detail in the foregoing method embodiments.

It should be further understood that, when the communication apparatus 900 is the second device, the transceiver unit 920 in the communication apparatus 900 may be implemented by using a communication interface (for example, a transceiver or an input/output interface), for example, may correspond to the transceiver 1210 in the second device 1200 shown in FIG. 12. The processing unit 910 in the communication apparatus 900 may be implemented by using at least one processor, for example, may correspond to the processor 1220 in the second device 1200 shown in FIG. 12. The processing unit 910 in the communication apparatus 900 may be implemented by using at least one logic circuit.

FIG. 10 is a schematic diagram of a structure of a terminal device 1000 according to an embodiment of this application. The terminal device 1000 may be used in the system shown in FIG. 1, to perform the functions of the terminal device in the foregoing method embodiments. For details, refer to the descriptions in the foregoing method embodiments. To avoid repetition, detailed descriptions are appropriately omitted herein.

As shown in the figure, the terminal device 1000 includes a processor 1010 and a transceiver 1020. Optionally, the terminal device 1000 further includes a memory 1030. The processor 1010, the transceiver 1020, and the memory 1030 may communicate with each other through an internal connection path, to transfer a control signal and/or a data signal. The memory 1030 is configured to store a computer program. The processor 1010 is configured to invoke the computer program from the memory 1030 and run the computer program, to control the transceiver 1020 to send and receive a signal. Optionally, the terminal device 1000 may further include an antenna 1040, configured to send, by using a radio signal, uplink data or uplink control signaling output by the transceiver 1020.

The processor 1010 and the memory 1030 may be integrated into one processing apparatus. The processor 1010 is configured to execute program code stored in the memory 1030, to implement the foregoing functions. During specific implementation, the memory 1030 may alternatively be integrated into the processor 1010, or may be independent of the processor 1010. The processor 1010 may correspond to the processing unit in FIG. 9.

The transceiver 1020 may correspond to the transceiver unit in FIG. 9. The transceiver 1020 may include a receiver (or referred to as a receiver circuit) and a transmitter (or referred to as a transmitter circuit). The receiver is configured to receive a signal, and the transmitter is configured to transmit a signal.

Optionally, the terminal device 1000 may further include a power supply 1050 configured to supply power to various devices or circuits in the terminal device.

In addition, to improve functions of the terminal device, the terminal device 1000 may further include one or more of an input unit 1060, a display unit 1070, an audio circuit 1080, a camera 1090, a sensor 1100, and the like, and the audio circuit may further include a speaker 1082, a microphone 1084, and the like.

FIG. 11 is a schematic diagram of a structure of a first device according to an embodiment of this application. For example, FIG. 11 may be a schematic diagram of a related structure of the first device.

As shown in the figure, the first device 1100 includes a transceiver unit 1110 and a processing unit 1120. The transceiver unit 1110 may also be referred to as a transceiver, a transceiver circuit, a transceiver, or the like, and may include at least one antenna 1111 and a radio frequency unit 1112. Optionally, the transceiver unit 1110 may include a receiving unit and a sending unit. The receiving unit may correspond to a receiver (or referred to as a receiver circuit), and the sending unit may correspond to a transmitter (or referred to as a transmitter circuit). The processing unit 1120 includes a processor 1122, and is mainly configured to complete baseband processing functions such as channel encoding, multiplexing, modulation, and spreading. Optionally, the processing unit 1120 further includes a memory 1121. The memory 1121 is configured to store a computer program. The processor 1122 is configured to invoke the computer program from the memory 1121 and run the computer program, to control the transceiver 1110 to send and receive a signal.

It should be understood that, the first device 1100 shown in FIG. 11 can implement the processes related to the first device in the method embodiments shown in FIG. 3A, FIG. 3B, FIG. 5, and FIG. 8. The operations and/or the functions of the modules in the first device 1100 are separately for implementing corresponding procedures in the foregoing method embodiments. For details, refer to the descriptions in the foregoing method embodiments. To avoid repetition, detailed descriptions are appropriately omitted herein.

It should be understood that the first device 1100 shown in FIG. 11 is merely a possible architecture of a first device and should not constitute any limitation on this application. The methods provided in this application are applicable to a first device having another architecture, for example, a first device including a CU, a DU, and an AAU. A specific architecture of the first device is not limited in this application.

FIG. 12 is a schematic diagram of a structure of a second device according to an embodiment of this application. For example, FIG. 12 may be a schematic diagram of a related structure of the second device.

As shown in the figure, the second device 1200 includes a transceiver 1210 and a processor 1220. Optionally, the second device 1200 further includes a memory 1230. The memory 1230 is configured to store a computer program. The processor 1220 is configured to invoke the computer program from the memory 1230 and run the computer program, to control the transceiver 1210 to send and receive a signal.

It should be understood that, the second device 1200 shown in FIG. 12 can implement the processes related to the second device in the method embodiments shown in FIG. 3A, FIG. 3B, FIG. 5, and FIG. 8. The operations and/or the functions of the modules in the second device 1200 are separately for implementing corresponding procedures in the foregoing method embodiments. For details, refer to the descriptions in the foregoing method embodiments. To avoid repetition, detailed descriptions are appropriately omitted herein.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application specific integrated chip (application specific integrated circuit, ASIC), a system on chip (system on chip, SoC), a central processing unit (central processor unit, CPU), a network processor (network processor, NP), a digital signal processing circuit (digital signal processor, DSP), a micro controller unit (micro controller unit, MCU), a programmable controller (programmable logic device, PLD), or another integrated chip.

In an implementation process, the steps in the foregoing methods can be completed by using a hardware integrated logical circuit in the processor, or by using instructions in a form of software. The steps in the methods disclosed with reference to embodiments of this application may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in a memory. The processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, the steps in the foregoing method embodiments can be completed by using a hardware integrated logical circuit in the processor, or by using instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory. The processor reads information in the memory and completes the steps in the foregoing methods in combination with hardware of the processor.

It may be understood that the memory in embodiments of this application may be a transitory memory or a non-transitory memory, or may include a transitory memory and a non-transitory memory. The non-transitory memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (random access memory, RAM), used as an external cache. By way of example but not limitative description, many forms of RAMS may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and methods in this specification includes but is not limited to these and any memory of another proper type.

According to the methods provided in embodiments of this application, this application further provides a computer program product. The computer program product includes computer program code. When the computer program code is run on a computer, the computer is enabled to perform the methods in the embodiments shown in FIG. 3A, FIG. 3B, FIG. 5, and FIG. 8.

According to the methods provided in embodiments of this application, this application further provides a computer-readable medium. The computer-readable medium stores program code. When the program code is run on a computer, the computer is enabled to perform the methods in the embodiments shown in FIG. 3A, FIG. 3B, FIG. 5, and FIG. 8.

According to the methods provided in embodiments of this application, this application further provides a system, including the foregoing one or more terminal devices and one or more first devices.

The first device and the terminal device in the foregoing apparatus embodiments completely correspond to the first device or terminal device in the method embodiments. A corresponding module or unit performs a corresponding step. For example, a communication unit (a transceiver) performs a receiving or sending step in the method embodiments, and a processing unit (a processor) performs a step other than the sending or receiving step. For a function of a specific unit, refer to a corresponding method embodiment. There may be one or more processors.

All or some of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state drive (solid state disc, SSD)), or the like.

The first device and the terminal device in the foregoing apparatus embodiments completely correspond to the first device or terminal device in the method embodiments. A corresponding module or unit performs a corresponding step. For example, a communication unit (a transceiver) performs a receiving or sending step in the method embodiments, and a processing unit (a processor) performs a step other than the sending or receiving step. For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and according to, for example, a signal having one or more data packets (for example, data from two components interacting with another component in a local system, in a distributed system, and/or across a network such as the Internet interacting with another system by using a signal).

A person of ordinary skill in the art may be aware that, in combination with the examples described in embodiments disclosed in this specification, units and algorithm steps can be implemented by electronic hardware or a combination of computer software and the electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

In the foregoing embodiments, all or some of the functions of the functional units may be implemented by using software, hardware, firmware, or any combination thereof. When the software is used to implement the functions, all or some of the functions may be implemented in a form of a computer program product. The computer program product includes one or more computer instructions (programs). When the computer program instructions (programs) are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a first device, or the like) to perform all or some of the steps in the methods in embodiments of this application. The foregoing storage medium includes: any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
sending, by a terminal device, first indication information to an access network device of a wireless communication system, wherein the first indication information is a physical-layer hybrid automatic repeat request (HARQ) feedback and indicates that a first data block is not successfully received, the first data block is a transport block (TB) or a code block (CB) of the wireless communication system; and sending, by the terminal device, second indication information to the access network device, wherein the second indication information indicates that a first data unit in a first data frame is not successfully received, the first data unit comprises data in the first data block, and the first data unit comprises at least one of a service data adaptation protocol (SDAP) data packet, a packet data convergence protocol (PDCP) data packet, a radio link control (RLC) data packet, or a media access control (MAC) data packet.

2. The method according to claim 1, wherein the second indication information is carried on an uplink configured grant resource or a semi-persistent scheduling resource configured by a radio resource control (RRC) signaling.

3. The method according to claim 1, wherein the first data frame is a video data frame, and the first data unit is an image slice or an image tile.

4. The method according to claim 1, wherein the second indication information further indicates that the first data frame is a data frame at a first coding layer in layered data encoding.

5. The method according to claim 4, wherein the layered data encoding is scalable video coding (SVC) or scalability extension of high efficiency video coding (SHVC), and the first coding layer is a base layer or an enhancement layer.

6. The method according to claim 4, wherein the layered data encoding is multi-view video coding, and the first coding layer is a data layer inside a field of view (FOV) or a data layer outside the FOV.

7. An apparatus, comprising:
one or more processors; and
a memory having instructions stored thereon that, when executed by the one or more processors, cause the apparatus to send first indication information to an access network device of a wireless communication system, wherein the first indication information is a physical-layer hybrid automatic repeat request (HARQ) feedback and indicates that a first data block is not successfully received, the first data block is a transport block (TB) or a code block (CB) of the wireless communication system, and send second indication information to the access network device, wherein the second indication information indicates that a first data unit is not successfully received, the first data unit comprises data in the first data block, and the first data unit comprises at least one of a service data adaptation protocol (SDAP) data packet, a packet data convergence protocol (PDCP) data packet, a radio link control (RLC) data packet, or a media access control (MAC) data packet.

8. The apparatus according to claim 7, wherein the second indication information is carried on an uplink configured grant resource or a semi-persistent scheduling resource configured by a radio resource control (RRC) signaling.

9. The apparatus according to claim 7, wherein the first data frame is a video data frame, and the first data unit is an image slice or an image tile.

10. The apparatus according to claim 7, wherein the second indication information further indicates that the first data frame is a data frame at a first coding layer in layered data encoding.

11. The apparatus according to claim 10, wherein the layered data encoding is scalable video coding (SVC) or scalability extension of high efficiency video coding (SHVC), and the first coding layer is a base layer or an enhancement layer.

12. The apparatus according to claim 10, wherein the layered data encoding is multi-view video coding, and the first coding layer is a data layer inside a field of view (FOV) or a data layer outside the FOV.

13. A non-transitory computer readable medium, wherein the non-transitory computer readable medium stores instructions that are executable by a computer, and the instructions comprise instructions for:
sending first indication information to an access network device of a wireless communication system, wherein the first indication information is a physical-layer hybrid automatic repeat request (HARQ) feedback and indicates that a first data block is not successfully received, the first data block is a transport block (TB) or a code block (CB) of the wireless communication system; and
sending second indication information to the access network device, wherein the second indication information indicates that a first data unit in a first data frame is not successfully received, the first data unit comprises data in the first data block, and the first data unit comprises at least one of a service data adaptation protocol (SDAP) data packet, a packet data convergence protocol (PDCP) data packet, a radio link control (RLC) data packet, or a media access control (MAC) data packet.

14. The non-transitory computer readable medium according to claim 13, wherein the third indication information is carried on an uplink configured grant resource or a semi-persistent scheduling resource configured by a radio resource control (RRC) signaling.

15. The non-transitory computer readable medium according to claim 13, wherein the first data frame is a video data frame, and the first data unit is an image slice or an image tile.

16. The non-transitory computer readable medium according to claim 13, wherein the third indication information further indicates that the first data frame is a data frame at a first coding layer in layered data encoding.

17. The non-transitory computer readable medium according to claim 16, wherein the layered data encoding is scalable video coding (SVC) or scalability extension of high efficiency video coding (SHVC), and the first coding layer is a base layer or an enhancement layer.

18. The non-transitory computer readable medium according to claim 16, wherein the layered data encoding is multi-view video coding, and the first coding layer is a data layer inside a field of view (FOV) or a data layer outside the FOV.

19. The method according to claim 1, the second indication information including an identifier of the at least one of the SDAP data packet, the PDCP data packet, the RLC data packet, or the MAC data packet.

20. The apparatus to claim 7, the second indication information including an identifier of the at least one of the SDAP data packet, the PDCP data packet, the RLC data packet, or the MAC data packet.

* * * * *